(12) United States Patent
Hao et al.

(10) Patent No.: US 12,489,501 B2
(45) Date of Patent: Dec. 2, 2025

(54) DYNAMIC INTERFERENCE MEASUREMENT FOR MULTIPLE-TRP CSI

(71) Applicant: QUALCOMM Incorporated, San Diego, CA (US)

(72) Inventors: Chenxi Hao, Beijing (CN); Yu Zhang, San Diego, CA (US); Chao Wei, Beijing (CN); Hao Xu, Beijing (CN); Wanshi Chen, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 643 days.

(21) Appl. No.: 17/758,645

(22) PCT Filed: Feb. 7, 2020

(86) PCT No.: PCT/CN2020/074520
§ 371 (c)(1),
(2) Date: Jul. 12, 2022

(87) PCT Pub. No.: WO2021/155585
PCT Pub. Date: Aug. 12, 2021

(65) Prior Publication Data
US 2023/0061722 A1 Mar. 2, 2023

(51) Int. Cl.
*H04B 7/06* (2006.01)
*H04B 17/336* (2015.01)

(52) U.S. Cl.
CPC .......... *H04B 7/0626* (2013.01); *H04B 7/063* (2013.01); *H04B 17/336* (2015.01)

(58) Field of Classification Search
CPC ..... H04B 7/0626; H04B 17/336; H04B 7/063
See application file for complete search history.

(56) References Cited

U.S. PATENT DOCUMENTS

| 9,537,638 B2 | 1/2017 | Geirhofer et al. |
| 10,103,855 B2 | 10/2018 | Chen et al. |

(Continued)

FOREIGN PATENT DOCUMENTS

| CN | 103391124 A | 11/2013 |
| CN | 108810932 A | 11/2018 |

(Continued)

OTHER PUBLICATIONS

Supplementary Partial European Search Report—EP20917662—Search Authority—The Hague—Oct. 4, 2023.

(Continued)

*Primary Examiner* — Natasha W Cosme
(74) *Attorney, Agent, or Firm* — Patterson+ Sheridan, L.L.P.

(57) ABSTRACT

Certain aspects of the present disclosure provide techniques for channel state information (CSI) for multiple transmission reception point (mTRP) scenarios. The techniques may provide for dynamic interference measurement for mTRP CSI. A method that may be performed by a user equipment (UE) includes receiving a CSI reporting configuration configuring the UE with a plurality of CSI reference signal (CSI-RS) resources for channel measurement (CMRs) and a plurality of resources for interference measurement (IMRs). The method includes determining an indicator based on an association between one or more CMRs and one or more IMRs. A codepoint of the indicator is associated with an IMR or a set of IMRs by an order of the IMRs or the set of IMRs in the configuration, and is associated with a CMR, a CMR pair, or a part of the ports of a CMR. The method generally includes performing CSI measurement based on the association.

16 Claims, 25 Drawing Sheets

(56) References Cited

U.S. PATENT DOCUMENTS

| | | | |
|---|---|---|---|
| 2018/0262252 A1 | 9/2018 | Oh et al. | |
| 2019/0335475 A1 | 10/2019 | Liang et al. | |
| 2020/0007299 A1 | 1/2020 | Han et al. | |
| 2022/0060266 A1* | 2/2022 | Xiao | H04L 5/0048 |

FOREIGN PATENT DOCUMENTS

| | | |
|---|---|---|
| CN | 110149186 A | 8/2019 |
| CN | 110535515 A | 12/2019 |
| WO | 2013170114 | 11/2013 |
| WO | 2015147997 A1 | 10/2015 |
| WO | 2017048107 A1 | 3/2017 |

OTHER PUBLICATIONS

Supplementary European Search Report—EP20917662—Search Authority—The Hague—Jan. 30, 2024.
International Search Report and Written Opinion—PCT/CN2020/074520—ISA/EPO—Nov 10, 2020.
OPPO: "Discussion on Multi-Beam Operation Enhancements", 3GPP Draft, 3GPP TSG RAN WG1 #98bis, R1-1910117, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 4, 2019 (Oct. 4, 2019), XP051808071, 11 pages, Retrieved from the Internet: URL: https://ftp.3gpp.org/tsg_ran/WG1_RL1,TSGR1_98b/Docs/R1-1910117.zip R1-1910117.docx [retrieved on Oct. 4, 2019] pp. 5-7, 2.2. SCell BFR.

* cited by examiner

| CRI | 0 | 1 |
|---|---|---|
| CSI-RS resource for CM | n1 | n2 |
| CSI-IM resource | m1 | m2 |

FIG. 7

| CRI | 0 | 1 | 2 | |
|---|---|---|---|---|
| CSI-RS resource for CM | n1 | n2 | n1 | n2 |
| CSI-IM resource | m1 | m2 | m3 | |

FIG. 9

| CRI | 0 | 1 | 2 | |
|---|---|---|---|---|
| CSI-RS resource for CM | n1 | n2 | n1 | n2 |
| CSI-IM resource | m1 | m2 | m3 | |
| NZP IMR set | s1 | s2 | N/A | |

FIG. 11

| CRI of Rep 0 | 0 | 1 |
|---|---|---|
| CSI-RS resource for CM | n1 | n1, n2 |
| CSI-IM resource | m1 | m3 |
| CRI of Rep 1 | 0 | 1 |
| CSI-RS resource for CM | n2 | n1, n2 |
| CSI-IM resource | m2 | m3 |

FIG. 13

| | | |
|---|---|---|
| CRI of Rep 0 | 0 | 1 |
| CSI-RS resource for CM | n1 | n1, n2 |
| CSI-IM resource | m1 | m3 |
| NZP IMR set | s1 | N/A |
| CRI of Rep 1 | 0 | 1 |
| CSI-RS resource for CM | n2 | n1, n2 |
| CSI-IM resource | m2 | m3 |
| NZP IMR set | s2 | N/A |

FIG. 14

| RI-pair | (RI0>0, RI1=0) | (RI0=0, RI1>0) | (RI0>0, RI1>0) |
|---|---|---|---|
| CSI-RS resource for CM | Res 0, group 0 | Res 0, group 1 | Res 0, group 0 and 1 |
| CSI-IM resource | m1 | m2 | m3 |

FIG. 15

| RI-pair | (RI0>0, RI1=0) | (RI0=0, RI1>0) | (RI0>0, RI1>0) |
|---|---|---|---|
| CSI-RS resource for CM | Res 0, group 0 | Res 0, group 1 | Res 0, group 0 and 1 |
| CSI-IM resource | m1 | m1 | m1 |
| NZP resource set for IM | s1 | s2 | N/A |

FIG. 17

| Emulation of TRP | Alt1<br>CSI-RS Resource | Alt2<br>CSI-RS Port-group | Alt3<br>CSI Report config |
|---|---|---|---|
| Report & resource config | | | |
| # TCIs per resource | 1 | 2 | 1 |
| Single TRP (e.g., DPS) indicator | CRI = 0 or CRI = 1 | (RI0 > 0, 0) or (0, RI1 > 0) | Same CRI = 0 for Rep 0 and Rep 1 |
| NCJT indicator | CRI = 2 | (RI0 > 0, RI1 > 0) | Same CRI = 1 for Rep 0 and Rep 1 |

FIG. 19

|  | # Port | Type | CBSR |
|---|---|---|---|
| CB config 0 | 4 | I | Beam 0 and 1 |
| CB config 1 | 8 | Rel-15 II | Beam 4 and 5 |

FIG. 21

| CRI | 0 | 1 | 2 | |
|---|---|---|---|---|
| CSI-RS resource for CM | 0 | 1 | 2 | 3 |
| CSI-IM resource | 0 | 1 | 2 | |
| CB config | 0 | 1 | 0 | 1 |

FIG. 22

DYNAMIC INTERFERENCE MEASUREMENT FOR MULTIPLE-TRP CSI

CROSS-REFERENCE TO RELATED APPLICATION(S)

This application is a national stage application under 35 U.S.C. 371 of PCT/CN2020/074520, filed Feb. 7, 2020, which is hereby assigned to the assignee hereof, and hereby expressly incorporated by reference herein in its entirety as if fully set forth below and for all applicable purposes.

BACKGROUND

Field of the Disclosure

Aspects of the present disclosure relate to wireless communications, and more particularly, to techniques for dynamic interference measurement for multiple-transmission reception point (mTRP) channel state information (CSI).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved dynamic interference measurement for multiple transmission reception point (mTRP) channel state information (CSI).

Certain aspects of the subject matter described in this disclosure can be implemented in a method for wireless communication by a user equipment (UE). The method generally includes receiving a CSI reporting configuration configuring the UE with a plurality of CSI reference signal (CSI-RS) resources for channel measurement (CMRs) and a plurality of resources for interference measurement (IMRs). The method generally includes determining an indicator based on an association between one or more CMRs and one or more IMRs. A codepoint of the indicator is associated with an IMR or a set of IMRs by an order of the IMRs or the set of IMRs in the configuration. A codepoint of the indicator is associated with a CMR, a CMR pair, or a part of the ports of a CMR. The method generally includes performing CSI measurement based on the association.

Certain aspects of the subject matter described in this disclosure can be implemented in a method for wireless communication by a UE. The method generally includes receiving a CSI reporting configuration configuring the UE with a plurality of CMRs. The method generally includes determining an indicator, wherein a codepoint of the indicator is associated with one CMR, a pair of CMRs, a port-group of a CMR, or two port-groups of a CMR. The method generally includes determining the association between the codepoint and the CMR, pair of CMRs, port-group of a CMR, or two port-groups of a CMR based on a network configuration, or based on the number of the CMRs or the number of the port-groups in a CMR, via a rule. The method generally includes performing CSI measurement based on the association. The method generally includes reporting a codepoint of the indicator indicating a selected CMR, CMR-pair, port-group of a CMR, or two port-groups of a CMR.

Certain aspects of the subject matter described in this disclosure can be implemented in a method for wireless communication by a base station (BS). The method generally includes configuring a UE a CSI reporting configuration configuring the UE with a plurality of CMRs and a plurality of IMRs. The method generally includes determining an indicator based on an association between one or more CMRs and one or more IMRs. A codepoint of the indicator is associated with an IMR or a set of IMRs by an order of the IMRs or the set of IMRs in the configuration, and is associated with a CMR, a CMR pair, or a part of the ports of a CMR. The method generally incudes receiving a CSI report based on the association.

Certain aspects of the subject matter described in this disclosure can be implemented in a method for wireless communication by a BS. The method generally includes configuring a UE with a CSI reporting configuration configuring the UE with a plurality of CMRs. The method generally includes determining an indicator. A codepoint of the indicator is associated with one CMR, a pair of CMRs, a port-group of a CMR, or two port-groups of a CMR. The method generally includes determining the association between the codepoint and the CMR, pair of CMRs, port-group of a CMR, or two port-groups of a CMR. The association is configured at the UE or is based on the number of CMRs or the number of port-groups in a CMR via a rule. The method generally includes receiving a CSI report based on the association. The method generally includes receiving a codepoint of the indicator indicating a selected CMR, CMR-pair, port-group of a CMR, or two port-groups of a CMR.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 is a table showing an example one-to-one mapping of a codepoint of a single CSI resource indicator (CRI) and a corresponding CSI reference signal (CSI-RS) resource for channel measurement (CMR) and a single CSI-RS resource for interference measurement (CSI-IM).

FIG. 9 is a table showing an example one-to-one mapping of CRI codepoints corresponding CRM resource(s) to CSI-IM resource(s), in accordance with certain aspects of the present disclosure.

FIG. 11 is a table shown an example one-to-one mapping of a codepoint of a CRI and corresponding CMR to NZP-IMR set(s), in accordance with certain aspects of the present disclosure.

FIG. 13 is a table showing an example one-to-one mapping of a codepoint of CRI and corresponding CMR to CSI-IM resource using two CSI reports, in accordance with certain aspects of the present disclosure.

FIG. 14 is a table showing an example one-to-one mapping of a codepoint of CRI and corresponding CMR to NZP-IMR resources using two CSI reports, in accordance with certain aspects of the present disclosure.

FIG. 15 is a table showing an example one-to-one mapping of a rank indicator (RI)-pair and corresponding CMR port group to CSI-IM resources, in accordance with certain aspects of the present disclosure.

FIG. 17 is a table showing an example one-to-one mapping of a RI-pair and corresponding CMR port group to CSI-IM, and NZP-IMR set, in accordance with certain aspects of the present disclosure.

FIG. 19 is a table showing example solutions for dynamic interference measurement for mTRP CSI, in accordance with certain aspects of the present disclosure.

FIG. 21 is a table showing example codebook configurations, in accordance with certain aspects of the present disclosure.

FIG. 22 is a table showing an example one-to-one mapping of a codepoint of CRI and corresponding CRM to CSI-IM, NZP-IMR set, and codebook configuration, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
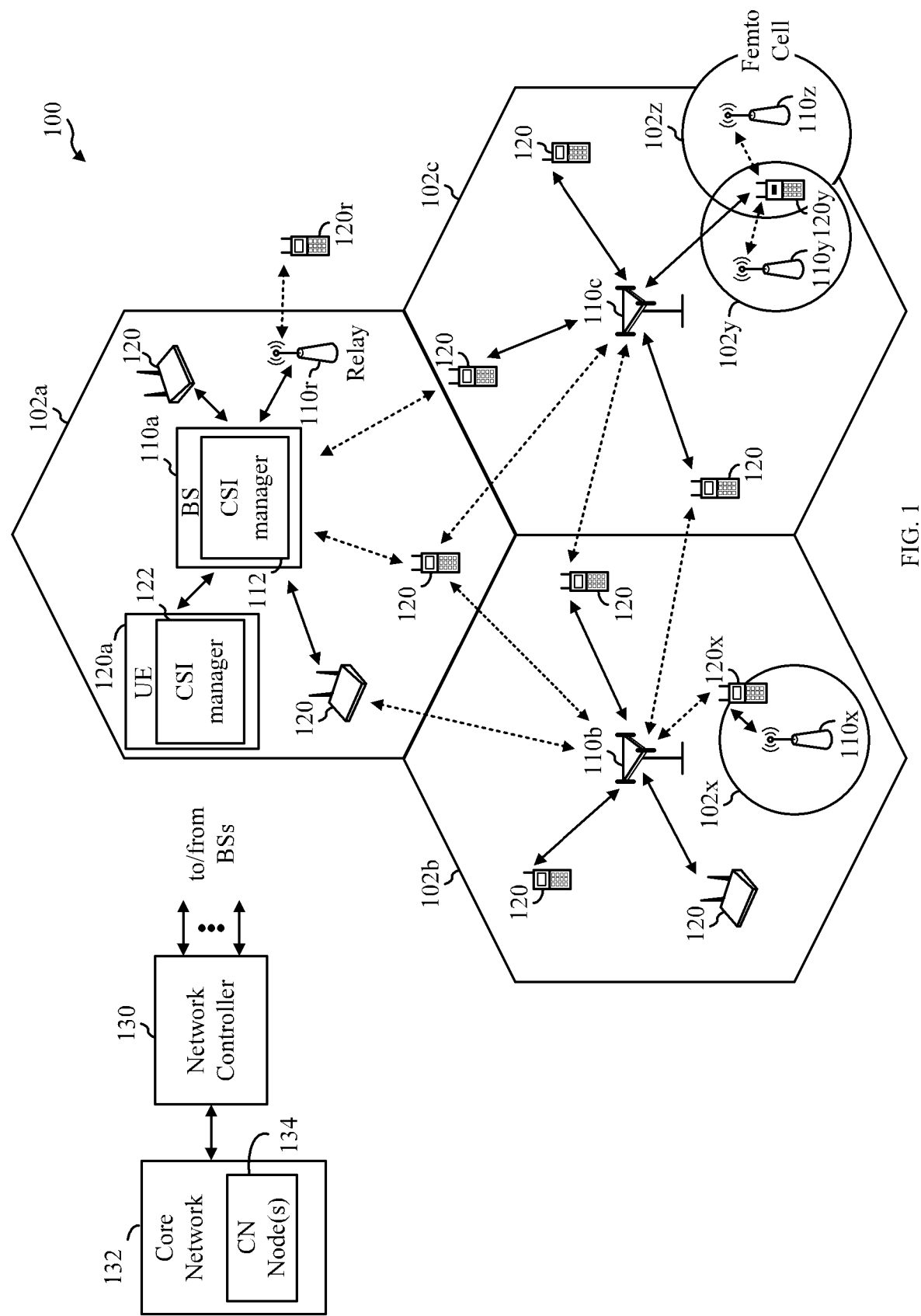
FIG. 1 is a block diagram conceptually illustrating an example telecommunications system, in accordance with certain aspects of the present disclosure.

Aspects of the present disclosure provide apparatus, methods, processing systems, and computer readable mediums for supporting a dynamic channel hypothesis for wireless transmission for multiple transmission reception point (mTRP) transmission.

In certain systems, such as new radio (NR) systems, a user equipment (UE) is configured with N non-zero power (NZP) channel state information (CSI) reference signal (CSI-RS) resources for channel measurement (CMRs). The UE is configured to select one resource out of the configured N resources. The UE is also configured with CSI-RS resources for interference measurement (CSI-IMRs). The resources for interference measurement are associated with the configured resources for channel measurement. This CSI framework allows dynamic channel/interference hypothesis in the case of transmission by a single transmission reception point (TRP), but does support transmission by multiple TRPs.

Aspects of the present disclosure provide apparatus, methods, processing systems, and computer readable mediums to support dynamic channel hypothesis for mTRP CSI. In some examples, a one-to-one mapping between CSI-RS resource indicator (CRI) or rank indicator-pair codepoint to one or more CMRs and to one or more CSI-IM—with one CSI-IM associated with one CMR. In some examples, a one-to-one mapping is provide for the CRI/RI-pair codepoint to one or more CMRs and to one or more NZP-IMR sets—with each NZP-IMR set associated with one codepoint. In some examples, a mapping is provided for the CRI/RI-pair codepoint to codebook, for example, in addition to the resource mapping.

The following description provides examples of dynamic interference measurement for mTRP CSI in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for dynamic interference measurement for mTRP CSI. As shown in FIG. 1, the BS 110a includes a CSI manager 112. As shown in FIG. 1, the UE 120a includes a CSI manager 122. The CSI manager 112 and the CSI manager 122 may be configured to perform dynamic interference measurement for mTRP CSI, in accordance with aspects of the present disclosure.

Figure 2:
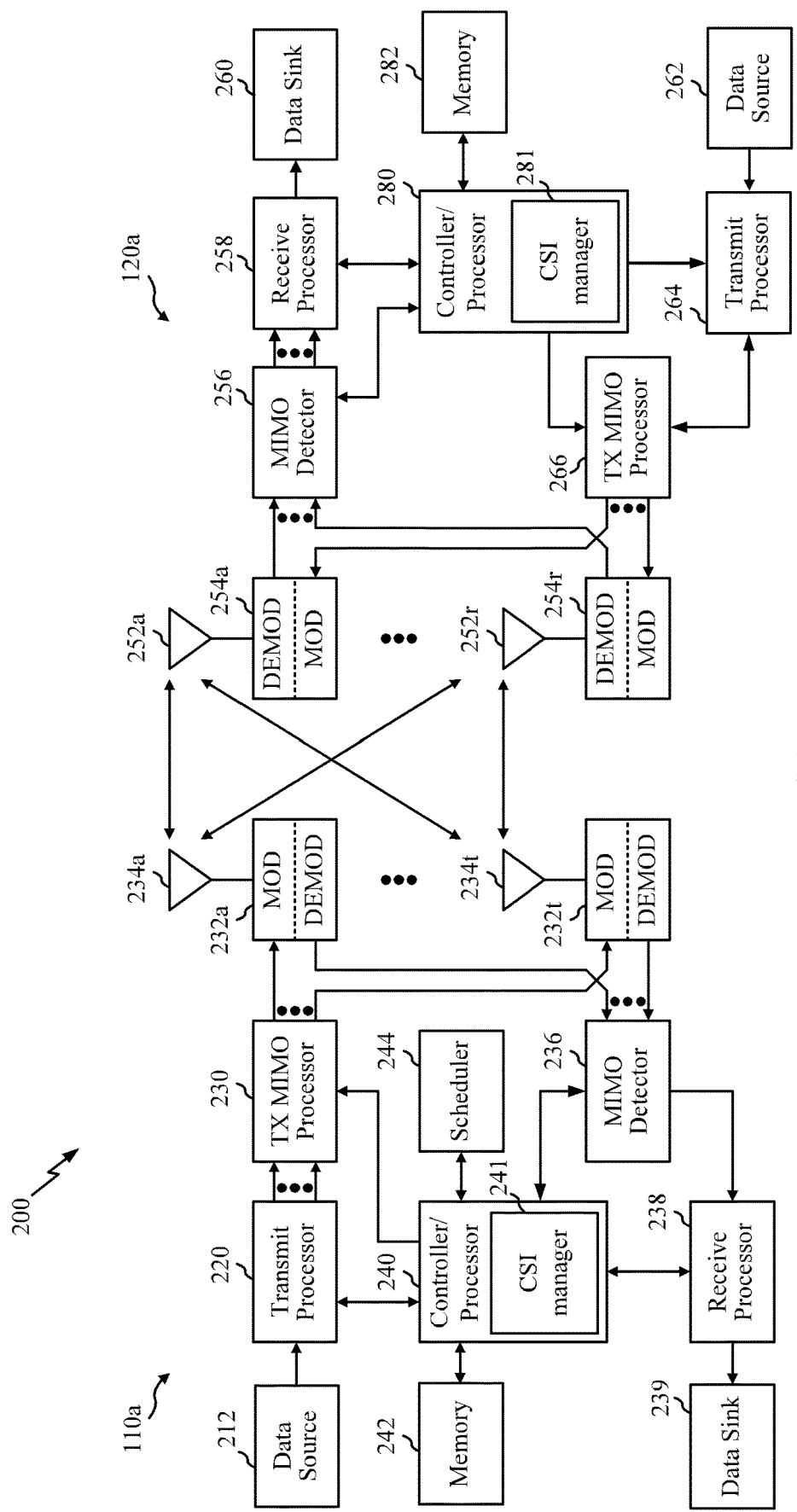
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a CSI manager 241 that may be configured for dynamic interference measurement for mTRP CSI, according to aspects described herein. As shown in FIG. 2, the controller/processor 280 of the UE 120a has a CSI manager 281 that may be configured for dynamic interference measurement for mTRP CSI, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
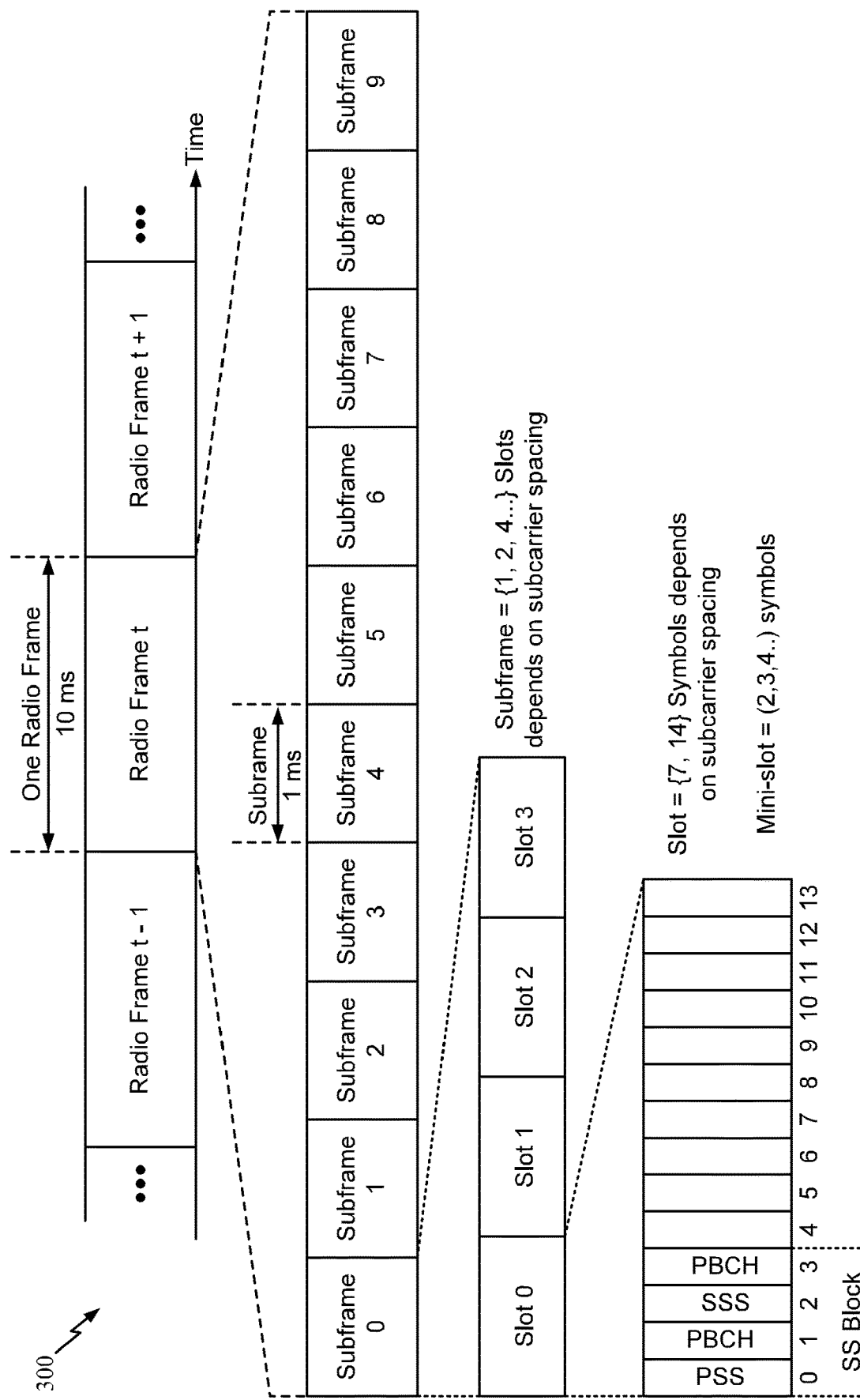
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example CSI Feedback Configuration

CSI may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

A UE (e.g., such as a UE 120a) may be configured by a BS (e.g., such as a BS 110) for CSI reporting. The BS may configure the UE with a CSI reporting configuration or with multiple CSI report configurations. The BS may provide the CSI reporting configuration to the UE via higher layer signaling, such as radio resource control (RRC) signaling (e.g., via a CSI-ReportConfig information element (IE)).

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

The CSI report configuration may configure the time and frequency resources used by the UE to report CSI. For example, the CSI report configuration may be associated with CSI-RS resources for channel measurement (CM), interference measurement (IM), or both. The CSI report configuration may configure CSI-RS resources for measurement (e.g., via a CSI-ResourceConfig IE). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM. For interference measurement, it can be NZP CSI-RS or zero power CSI-RS, which is known as CSI-IM (note, if NZP CSI-RS, it is called NZP CSI-RS for interference measurement, if zero power, it is called CSI-IM)

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource. The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource.

The CSI report configuration can also configure the CSI parameters (sometimes referred to as quantities) to be reported. Codebooks may include Type I single panel, Type I multi-panel, and Type II single panel. Regardless which codebook is used, the CSI report may include at least the channel quality indicator (CQI), precoding matrix indicator (PMI), CSI-RS resource indicator (CRI), and rank indicator (RI). The structure of the PMI may vary based on the codebook. The CRI, RI, and CQI may be in a first part (Part I) and the PMI may be in a second part (Part II) of the CSI report.

For the Type I single panel codebook, the PMI may include a W1 matrix (e.g., subset of beams) and a W2 matrix (e.g., phase for cross polarization combination and beam selection). For the Type I multi-panel codebook, compared to type I single panel codebook, the PMI further comprises a phase for cross panel combination. The BS may have a plurality of transmit (TX) beams. The UE can feed back to the BS an index of a preferred beam, or beams, of the candidate beams. For example, the UE may feed back the precoding vector w for the l-th layer:

$$w_l = \begin{pmatrix} b_{+45pol} \\ \varphi \cdot b_{-45pol} \end{pmatrix}$$

where b represents the oversampled beam (e.g., discrete Fourier transform (DFT) beam), for both polarizations, and p is the co-phasing.

For the Type II codebook (e.g., which may be designed for single panel), the PMI is a linear combination of beams; it has a subset of orthogonal beams to be used for linear combination and has per layer, per polarization, amplitude and phase for each beam. The preferred precoder for a layer can be a combination of beams and associated quantized coefficients, and the UE can feedback the selected beams and the coefficients to the BS.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Example SD Compressed CSI Feedback

In certain systems (e.g., Release 15 5G NR), the UE may be configured to report at least a Type II precoder across configured frequency domain (FD) units. The UE may report wideband (WB) PMI and/or subband (SB) PMI as configured.

For a layer 1, its precoder across $N_3$ FD units (also referred to as PMI subbands) may be given by a size-$N_t \times N_3$ matrix $W_l$ as follows:

$$W_l = W_1 \times W_{2,l},$$

where $W_1$ and $W_{2,l}$ are as described in the following table:

| Notation | size | description | Comment |
|---|---|---|---|
| $W_1$ | $N_t \times 2L$ | SD basis; same SD bases are applied to both polarizations | Layer-common |
| $W_{2,l}$ | $2L \times N_3$ | Coefficient matrix: | Layer-specific; |

Note:
L value is rank-common and layer-common

The two matrices can be written as:

$$W_1 = \begin{bmatrix} v_{m_1^{(0)},m_2^{(0)}}, v_{m_1^{(1)},m_2^{(1)}}, \ldots, v_{m_1^{(L-1)},m_2^{(L-1)}} & 0 \\ 0 & v_{m_1^{(0)},m_2^{(0)}}, v_{m_1^{(1)},m_2^{(1)}}, \ldots, v_{m_1^{(L-1)},m_2^{(L-1)}} \end{bmatrix},$$

where the SD bases are DFT based and the SD basis with index $m_1^{(i)}$ and $m_2^{(i)}$ is written as $$v_{m_1^{(i)},m_2^{(i)}} = \left[ u_{m_2^{(i)}} \ e^{\frac{j2\pi m_1^{(i)}}{O_1 N_1}} u_{m_2^{(i)}} \ \ldots \ e^{\frac{j2\pi m_1^{(i)}(N_1-1)}{O_1 N_1}} u_{m_2^{(i)}} \right]^T,$$

$$u_{m_2^{(i)}} = \left[ 1 \ e^{\frac{j2\pi m_2^{(i)}}{O_2 N_2}} \ \ldots \ e^{\frac{j2\pi m_2^{(i)}(N_2-1)}{O_2 N_2}} \right]$$

and where the coefficient matrix may be written as $$W_{2,l} = \begin{bmatrix}
p_{0,l,0}^{(1)} p_{0,l,0}^{(2)} e^{j\phi_{0,l,0}} & p_{0,l,1}^{(1)} p_{0,l,1}^{(2)} e^{j\phi_{0,l,1}} & \cdots & p_{0,l,M-1}^{(1)} p_{0,l,M-1}^{(2)} e^{j\phi_{0,l,M-1}} \\
p_{1,l,0}^{(1)} p_{1,l,0}^{(2)} e^{j\phi_{1,l,0}} & p_{1,l,1}^{(1)} p_{1,l,1}^{(2)} e^{j\phi_{1,l,1}} & \cdots & p_{1,l,M-1}^{(1)} p_{1,l,M-1}^{(2)} e^{j\phi_{1,l,M-1}} \\
\vdots & \vdots & \ddots & \vdots \\
p_{L-1,l,0}^{(1)} p_{L-1,l,0}^{(2)} e^{j\phi_{L-1,l,0}} & p_{L-1,l,1}^{(1)} p_{L-1,l,1}^{(2)} e^{j\phi_{L-1,l,1}} & \cdots & p_{L-1,l,M-1}^{(1)} p_{L-1,l,M-1}^{(2)} e^{j\phi_{L-1,l,M-1}} \\
p_{L,l,0}^{(1)} p_{L,l,0}^{(2)} e^{j\phi_{L,l,0}} & p_{L,l,1}^{(1)} p_{L,l,1}^{(2)} e^{j\phi_{L,l,1}} & \cdots & p_{L,l,M-1}^{(1)} p_{L,l,M-1}^{(2)} e^{j\phi_{L,l,M-1}} \\
p_{L+1,l,0}^{(1)} p_{L+1,l,0}^{(2)} e^{j\phi_{L+1,l,0}} & p_{L+1,l,1}^{(1)} p_{L+1,l,1}^{(2)} e^{j\phi_{L+1,l,1}} & \cdots & p_{L+1,l,M-1}^{(1)} p_{L+1,l,M-1}^{(2)} e^{j\phi_{L+1,l,M-1}} \\
\vdots & \vdots & \ddots & \vdots \\
p_{2L-1,l,0}^{(1)} p_{2L-1,l,0}^{(2)} e^{j\phi_{2L-1,l,0}} & p_{2L-1,l,1}^{(1)} p_{2L-1,l,1}^{(2)} e^{j\phi_{2L-1,l,1}} & \cdots & p_{2L-1,l,M-1}^{(1)} p_{2L-1,l,M-1}^{(2)} e^{j\phi_{2L-1,l,M-1}}
\end{bmatrix}$$

In some cases, a common (P1) value may apply to all $p_{i,m,l}^{(1)}$ coefficients (or simply P1 coefficients) in one row. In such cases, given 2 L rows in the matrix, the P1 value is row-specific and there might be 2 L different values for these coefficients. The coefficients $p_{i,m,l}^{(1)}$, $p_{i,m,l}^{(2)}$ and $\varphi_{i,m,l}$ are described as follows:

| Notation | description | Alphabet |
|---|---|---|
| $p_{i,m,l}^{(1)}$ | Reference amplitude for beam i of the 1$^{st}$ polarization. $p_{i,m,l}^{(1)} = p_{i',m',l}^{(1)}$, $\forall i' \neq i$, m' $\neq$ m | $\{1, \sqrt{1/2}, \sqrt{1/4}, \sqrt{1/8}, \sqrt{1/16}, \sqrt{1/32}, \sqrt{1/64}, 0\}$ |
| $p_{i+L,m,l}^{(1)}$ | Reference amplitude for the 2$^{nd}$ polarization. $p_{i+L,m,l}^{(1)} = p_{i'+L,m',l}^{(1)}$, $\forall i' \neq i$, m' $\neq$ m | $\{1, \sqrt{1/2}, \sqrt{1/4}, \sqrt{1/8}, \sqrt{1/16}, \sqrt{1/32}, \sqrt{1/64}, 0\}$ |
| $p_{i,m,l}^{(2)}$ and $p_{i+L,m,l}^{(2)}$ | Differential amplitude for each individual coefficient | $\{1, \sqrt{0.5}\}$ |
| $\varphi_{i,m,l}$ and $\varphi_{i+L,m,l}$ | Phase of each individual coefficient | N-PSK, N = 4 or 8 |

More precisely, the linear combination representation may be written as:

$$W_l = \begin{pmatrix} \sum_{k=0}^{L-1} v_{m_1^{(i)},m_2^{(i)}} p_{i,m,l}^{(1)} p_{i,m,l}^{(2)} \varphi_{i,m,l} \\ \sum_{k=0}^{L-1} v_{m_1^{(i)},m_2^{(i)}} p_{i,m,l}^{(1)} p_{i,m,l}^{(2)} \varphi_{i,m,l} \end{pmatrix}$$

For linear combination of spatial beams B, the UE may report the linear combination coefficients $x_{i,k}^{(l)}$ for each layer l and each subband i, according to the precoding vector w:

$$W_i^{(l)} = \begin{pmatrix} B & 0 \\ 0 & B \end{pmatrix} \times x_i^{(l)} = \begin{pmatrix} \sum_{k=0}^{L-1} b_k \cdot x_{i,k}^{(l)} \\ \sum_{k=0}^{L-1} b_k \cdot x_{i+L,k}^{(l)} \end{pmatrix}$$

The precoder matrix W is based on the spatial domain (SD) compression of a matrix $W_1$ matrix and the $W_2$ matrix for reporting (for cross-polarization) the linear combination coefficients for the selected beams (2 L) across the configured FD units.

For port selection in certain systems (e.g., Rel-15 NR port selection), the BS (e.g., a gNB) may use a beam in $v_{m_1^{(i)},m_2^{(i)}}$ as the precoder for CSI-RS. The precoder for a layer on a subband is given by:

$$\begin{pmatrix} \sum_{i=0}^{L-1} v_{i_{11}d+i} \cdot p_i^{(1)} \cdot p_i^{(2)} \cdot \phi_i \\ \sum_{i=0}^{L-1} v_{i_{11}d+i} \cdot p_{i+L}^{(1)} \cdot p_{i+L}^{(2)} \cdot \phi_{i+L} \end{pmatrix},$$

where $v_{i_{11}d+i}$ is a vector. In this case, the UE selects the CSI-RS ports, for example, instead of selecting the beam. Thus, using this codebook, if the $(i_{11}d+i)$-th entry is equal to 1 and the rest are 0s, this means that the $(i_{11}d+i)$-th port is selected. With this codebook, there are P ports, where the first half of the ports are for polarization 1 and the other half of the ports are for polarization 2, and the same L ports are applied to both polarization. The UE reports the preferred candidate L ports via $i_{11}$, where the candidates are candidate L ports is 0 ... L−1, and candidate L ports d ... d+L−1. The last candidate L ports is $$\left[\frac{P}{2d}\right]d, \ldots, \mathrm{mod}\left(\left[\frac{P}{2d}\right]d + L - 1, \frac{P}{2}\right).$$

In this case, the UE may be restricted to select L consecutive ports (e.g., port $i_{11}d, \ldots i_{11} d+L-1$) and the maximum number ports may be 32, which may be insufficient and should accommodate FD basis.

Example SD and FD Compressed CSI Feedback

In certain systems (e.g., Rel-16 5G NR), the UE may be configured to report frequency domain (FD) compressed precoder feedback to reduce overhead of the CSI report. With codebook operation with FD compression, for a layer 1, its precoder across $N_3$ FD units (e.g., PMI subbands) is given by a size-$N_t \times N_3$ matrix $W_i$ as follows:

$$W_i = W_1 \times \tilde{W}_{2,i} \times W_{f,i}^H,$$

where $W_1$, $\tilde{W}_2$ and $W_f$ are as follows:

| Notation | size | description | Comment |
|---|---|---|---|
| $W_1$ | $N_t \times 2L$ | SD basis; same SD bases are applied to both polarizations | Layer-common |
| $\tilde{W}_{2,l}$ | $2L \times M$ | Coefficient matrix: Consist of max $K_0$ NZC per-layer; Consist of max $2K_0$ NZC across all layers | Layer-specific; |
| $W_{f,l}$ | $M \times N_3$ | FD basis; same M FD bases are applied to both polarizations | Layer-specific; |

Note: L value is rank-common and layer common M value is rank-group specific and layer common. $M = M_{1,2}$ for RI = {1, 2} and $M = M_{3,4} \le M_{1,2}$ for RI = {3, 4}

The precoder matrix ($W_{2,i}$) for layer i with i=0, 1 may use an FD compression $W_{f,i}^H$ matrix to compress the precoder matrix into $\tilde{W}_{2,i}$ matrix size to $2L \times M$ (where M is network configured and communicated in the CSI configuration message via RRC or DCI, and M<$N_3$) given as:

$$W_i = W_1 \tilde{W}_{2,i} W_{f,i}^H,$$

where the precoder matrix $W_i$ (not shown) has $P=2N_1N_2$ rows (spatial domain, number of ports) and $N_3$ columns (frequency-domain compression unit containing RBs or reporting sub-bands), and where M bases are selected for each of layer 0 and layer 1 independently. The $\tilde{W}_{2,0}$ matrix consists of the linear combination coefficients (amplitude and co-phasing), where each element represents the coefficient of a tap for a beam. The $\tilde{W}_{2,0}$ matrix may be defined by size $2L \times M$, where one row corresponds to one spatial beam in $W_1$ (not shown) of size $P \times 2L$ (where L is network configured via RRC), and one entry therein represents the coefficient of one tap for this spatial beam.

The UE may be configured to report (e.g., CSI report) a subset $K_0 < 2$ LM of the linear combination coefficients of the $\tilde{W}_{2,0}$ matrix. For example, the UE may report $K_{NZ,i} < K_0$ coefficients (where $K_{NZ,i}$ corresponds to a maximum number of non-zero coefficients for layer-i with i=0 or 1, and $K_0$ is network configured via RRC) illustrated as shaded squares (unreported coefficients are set to zero). In some configurations, an entry in the $\tilde{W}_{2,0}$ matrix corresponds to a row of $W_{f,0}^H$ matrix. In the example shown, both the $\tilde{W}_{2,0}$ matrix at layer 0 and the $\tilde{W}_{2,0}$ matrix at layer 1 are $2L \times M$.

The $W_{f,0}^H$ matrix is composed of the basis vectors (each row is a basis vector) used to perform compression in frequency domain. In the example shown, both the $W_{f,0}^H$ matrix at layer 0 and the $W_{f,1}^H$ matrix at layer 1 include M=4 FD basis from $N_3$ candidate DFT basis. In some configurations, the UE may report a subset of selected basis of the $W_{f,i}^H$ matrix via CSI report. The M bases specifically selected at layer 0 and layer 1. That is, the M bases selected at layer 0 can be same/partially-overlapped/non-overlapped with the M bases selected at layer 1.

The precoder may be written as:

$$W^{(l)} = \begin{pmatrix} \sum_{k=0}^{L-1} \sum_{m=0}^{M-1} b_k \cdot x_{m,k}^{(l)} \cdot f_{m,l}^H \\ \sum_{k=0}^{L-1} \sum_{m=0}^{M-1} b_k \cdot x_{m,k+L}^{(l)} \cdot f_{m,l}^H \end{pmatrix}$$

As discussed above, the Type II CSI with FD compression may compress $N_3$ subbands via M FD bases. The FD bases are selected/reported layer-specific. For each layer, the UE reports a subset of the total 2 LM coefficients, where the coefficient selection may be layer specific, and the UE may use a size-2 LM bitmap to indicate the selected non-zero coefficients (NZC) and report each the NZC after quantization. In some examples, the UE may report up to $K_0$ coefficients per layer, where $K_{N,Z,l} \le K_0$. In some examples, the UE may report up to $2K_0$ coefficients across all layers, where $\Sigma_{l=0}^{RI-1} K_{NZ,l} \le 2K_0$. Unreported are set to zeros.

The UE may report the CSI in uplink control information (UCI). In some examples, the CSI is reported in a two-part UCI. In some examples, in the UCI part one the UE may transmit RI, CQI, the number of non-zero coefficients (NNZC). In some examples, in the UCI part two the UE may transmit for the supported layers (e.g., layers 0 to RI-1) the SD beam selection, FD basis selection, coefficient selection, strongest coefficient indication (SCI), and/or coefficient quantization. The SD beam selection may indicate the selected beams (e.g., the subset of 2 L beams).

Example mTRP and NCJT

In certain system, transmissions may be via multiple transmission configuration indicator (TCI) states. In some examples, a TCI-state is associated with a beam pair, antenna panel, antenna ports, antenna port groups, a quasi-colocation (QCL) relation, and/or a transmission reception point (TRP). Thus, multi-TCI state transmission may be associated with multiple beam pairs, multiple antenna panels, and/or multiple QCL relations which may be associated with one or more multiple TRPs. The TCI state indicates the QCL assumption that the UE may use for channel estimation.

In some examples, the TCI state may generally indicate to the UE an association between a downlink reference signal to a corresponding QCL type which may allow the UE to determine the receive beam to use for receiving a transmission. The QCL-type may be associated with a combination (e.g., set) of QCL parameters. In some examples, a QCL- TypeA indicates the ports are QCL'd with respect to Doppler shift, Doppler spread, average delay, and delay spread; QCL-TypeB indicates the ports are QCL'd with respect to Doppler shift, and Doppler spread; QCL-TypeC indicates the ports are QCL'd with respect to average delay and Doppler shift; and QCL-TypeD indicates the ports are QCL'd with respect to Spatial Rx parameter. Different groups of ports can share different sets of QCL parameters.

In some examples, for a multi-TCI state scenario, the same TB/CB (e.g., same information bits but can be different coded bits) is transmitted from multiple TCI states, such as two or more TRPs in multi-TRP scenario. The UE considers the transmissions from both TCI states and jointly decodes the transmissions. In some examples, the transmissions from the TCI states is at the same time (e.g., in the same slot, mini-slot, and/or in the same symbols), but across different RBs and/or different layers. The number of layers from each TCI state can be the same or different. In some examples, for the same codeword (i.e., the same transport block/codeblock) mTRP transmission, the modulation order may be the same. For an mTRP transmission involving different codewords (e.g., two codewords from the two TRPs), then the each codeword may be associated with a rank, modulation, and resource allocation (e.g., referred to as a multi-DCI based mTRP transmission). In some examples, the transmissions from the TCI states can be at different times (e.g., in two consecutive mini-slots or slots). In some examples, the transmissions from the TRPs can be a combination of the above.

In certain wireless communication networks (e.g., new radio), non-coherent joint transmissions (NCJTs) may be used to provide multiple-input multiple-output (MIMO), multiple-user (MU) MIMO, and/or coordinated multi-point (CoMP) communications. The NCJTs may be from multiple transmission-reception points (multi-TRP), multiple panels (multi-panel) of a TRP, or a combination thereof. Coherent joint transmission requires synchronization among transmission reception points (TRPs). However, for distributed TRPs, the precoders cannot be jointly designed and, therefore, the TRPs are not synchronized. Instead, each TRP derives the precoder independently, without knowledge of the precoders used by the other TRPs. Thus, the joint transmission is non-coherent. Using NCJT, TRPs can transmit the same data to a UE to improve the transmission reliability/coverage. Also, using NCJT the TRPs can transmit different data streams to the UE to improve throughput. For NCJT, the UE can select multiple CSI reference signal (CSI-RS) resources, or a CSI-RS with multiple ports, for CSI reporting. Thus, the UE may be configured to report CRI indicating the selected resources along with CSI including RI, PMI, and CQI for each of the selected resources and/or port groups.

Aspects of the present disclosure generally relate to interference measurement for mTRP CSI.

Figure 4:
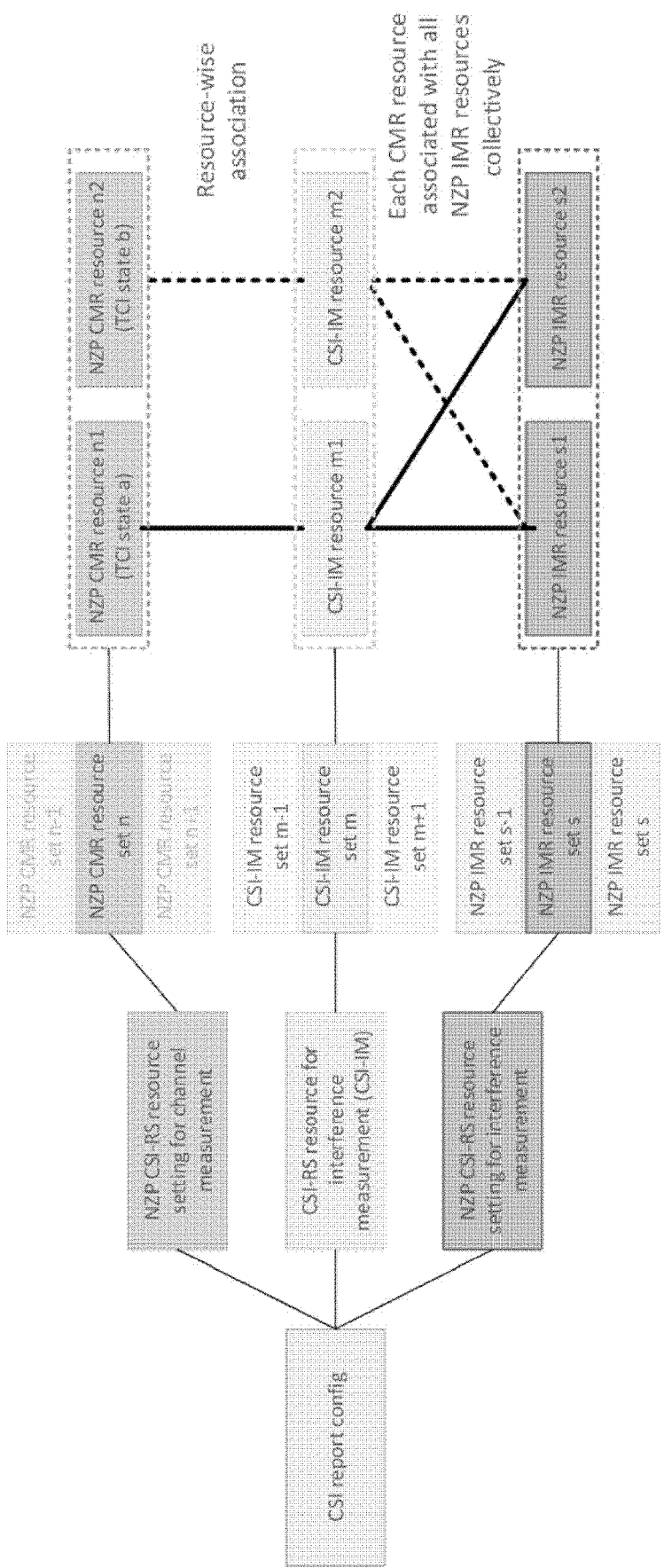
FIG. 4 is an example framework for a dynamic channel state information (CSI) report configuration.

As discussed above, a UE may be configured with a CSI report configuration. FIG. 4 illustrates an example CSI report configuration. As shown in FIG. 4, the CSI report configuration may configure the UE a CMR setting, a CMR setting and CSI-IM setting, or with a CMR setting, CSI-IM setting, and NZP-IMR setting. Each setting may be associated with multiple resource sets, each resource set including multiple resources. In some examples, the number of resources in the CMR sets may be the same as the number of resources in the CSI-IM sets, but the number of resources in the NZP-IMR sets may be different. Each resource setting may have one active set at a given time. The active set may have up to N=8 resources, and the UE may be configured to select one resource out of N configured CMRs. The CMRs may be resource-wise associated with a CSI-IM resource and NZP-IMR set. Each port of the NZP-IMRs may correspond to an interference layer. The NZP-IMRs and the CSI-IMs may share a Type-D QCL with the associated CMR. The UE may measure interference from the interference resources associated with the selected CMR. The UE may use the interference measurements to perform interference mitigation.

Figure 5:
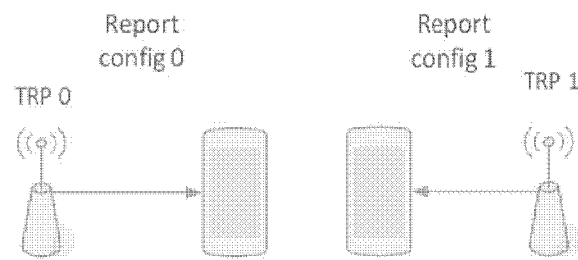
FIG. 5 is an example of independent CSI reports for different transmission reception points (TRPs) disclosure.
Figure 6:
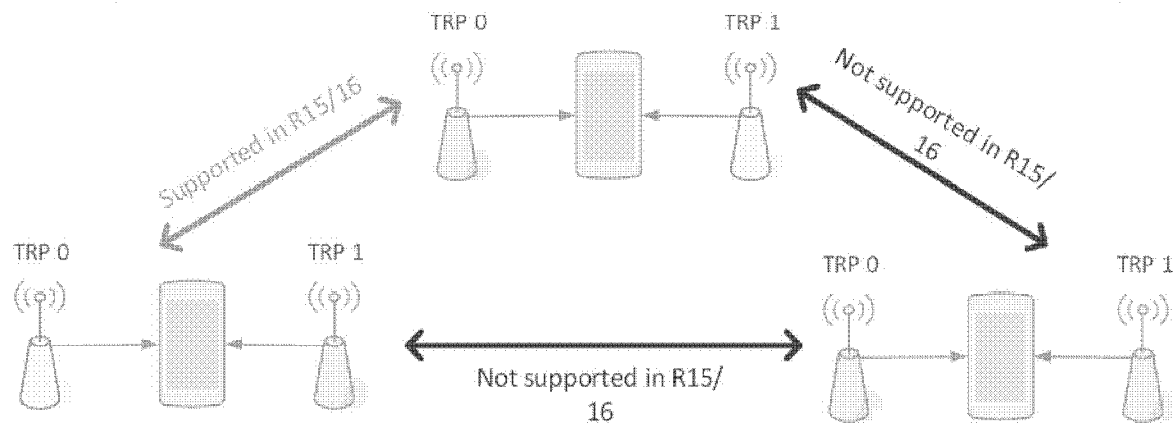
FIG. 6 is an example of a dynamic point selection system for multiple TRPs corresponding to specific transmission configuration indicator (TCI) states.
Figure 8A:
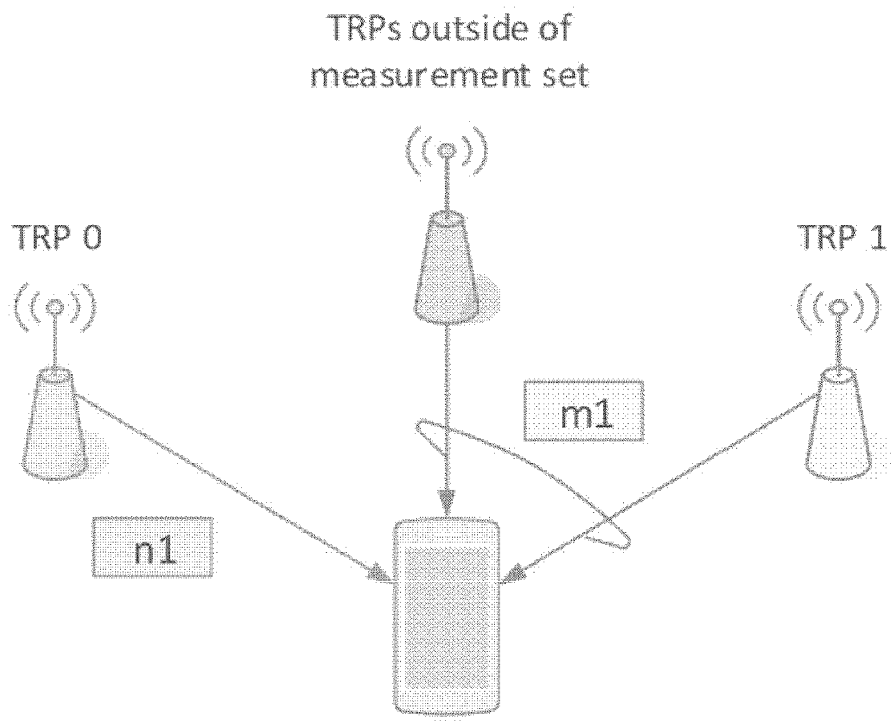
FIG. 8A is an example mTRP scenario with a first CMR and a first CS-IM resource, in accordance with certain aspects of the present disclosure.
Figure 8B:
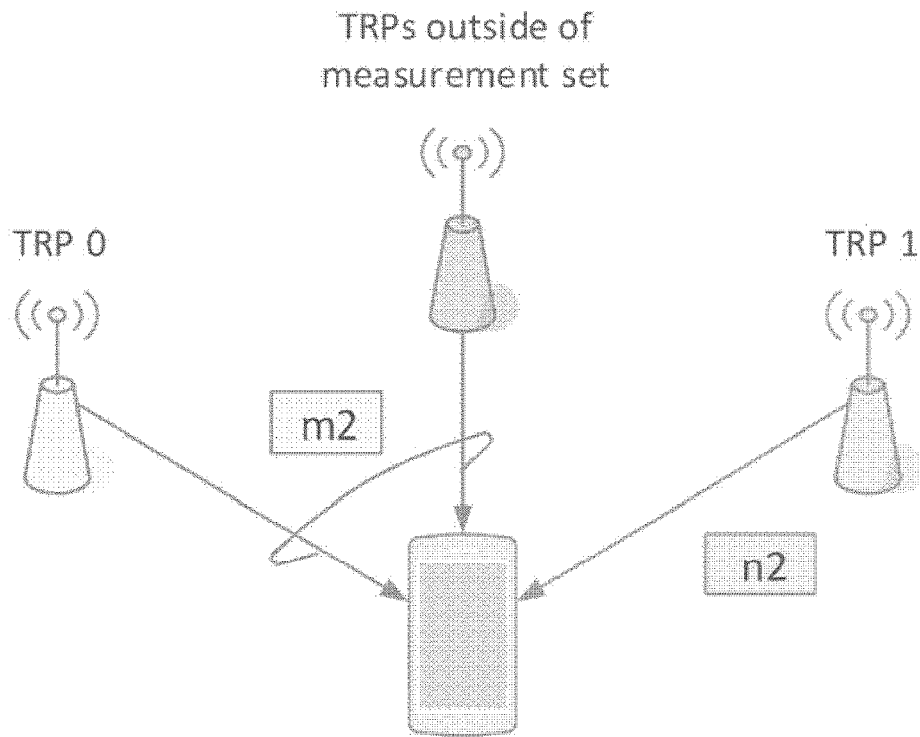
FIG. 8B is an example mTRP scenario with a second CMR and a second CS-IM, in accordance with certain aspects of the present disclosure.

The CSI report configuration supports CSI for one TRP, but may not support CSI for NCJT from multiple TRPs in an mTRP scenario. For example, for two TRPs, the UE uses an independent CSI reporting for each of the TRPs, as illustrated in FIG. 5 (e.g., CSI Report config 0 for TRP 0 and CSI Report config 1 for TRP 1). The UE may perform dynamic point selection, for example, by the selection one of N CMRs, the CMRs associated with different TRPs), but does not support selection of multiple CMRs/TCI states/TRPs as illustrated in FIG. 6 and FIG. 7. Further, the UE can select a CSI-IM to measure interference from a TRP outside of the measurement set as shown in the FIGS. 7, 8A and 8B. For example, a first CRI codepoint (e.g., CRI 0) may correspond to a first CMR (e.g., n1) and is mapped to a first CSI-IM (e.g., m1) as shown in FIG. 8A and a second CRI codepoint (e.g., CRI 1) may correspond to a second CMR (e.g., n2) and is mapped to a second CSI-IM (e.g., m2) as shown in FIG. 8B.

Accordingly, what is needed are techniques and apparatus for mTRP CSI to select and report the preferred TRP/TRP-pair.

Example Dynamic Interference Measurement for mTRP CSI

Aspects of the present disclosure provide techniques for channel state information (CSI) reporting that may be allow a user equipment (UE) to report CSI in a multiple transmission reception point (mTRP) scenario. For example, the CSI may be used for a non-coherent joint transmission (NJCT) from multiple TRPs. In some examples, the UE can report a preferred TRP or a preferred TRP-pair.

According to certain aspects, a CSI reference signal (CSI-RS) resource for channel measurement (CMR) is associated with a CSI-RS resource for interference measurement (IMR). The CMR and IMR may be associated via a CSI resource indicator (CRI) or a rank indicator (RI)-pair. For example, the CMR and IMR may be associated by a one-to-one mapping between a codepoint (CRI or RI-pair) and the IMR, the codepoint corresponding to one or more CMRs. The IMR may include one or more CSI-RS resources for interference measurement (CSI-IMs) and/or one or more non-zero power (NZP) CSI-RS resources for interference measurement (NZP-IMRs).

According to certain aspects, resources from different TRPs may be emulated by CSI-RS resource, port-groups, or CSI report configurations. In some examples, an indication of the codepoint associated with multiple TRPs (e.g., CRI 2, {RI>0, RI>0}, same CRI for two CSI reports) may indicate that the UE prefers mTRP transmission and the resources indicates may indicate the preferred TRPs.

According to certain aspects, a mapping is provide for CRI to resources.

Example mTRP CSI with TRPs Emulated Using Different CMRs or CMR-Pair

As mentioned above, TRPs may be emulated using different resources.

According to certain aspects, there may be a one-to-one mapping between a CRI codepoint (corresponding to a CMR or CMR-pair) and a CSI-IM resource, as shown in FIG. 9. Alternatively, there exists a mapping between one CSI-IM resource to a CMR pair. For example, the CRI may have codepoints corresponding to the single TRP selection case shown in the FIGS. 7, 8A, and 8B. As discussed above, a first CRI codepoint (e.g., CRI 0) may correspond to a first CMR (e.g., n1) and is mapped to a first CSI-IM (e.g., m1) as shown in FIG. 8A. In this case, the first channel/interference hypothesis includes measuring the channel using the CMR n1 corresponding to TRP0, and measuring interference using the CSI-IM m1 corresponding to interference from TRP1 and other TRPs outside the measurement set.

A second CRI codepoint (e.g., CRI 1) may correspond to a second CMR (e.g., n2) and is mapped to a second CSI-IM (e.g., m2) as shown in FIG. 8B. In this case, the channel/interference hypothesis includes measuring the channel using the CMR n2 corresponding to TRP1, and measuring interference using the CSI-IM m2 corresponding to interference from TRP0 and other TRPs outside the measurement set.

Figure 10:
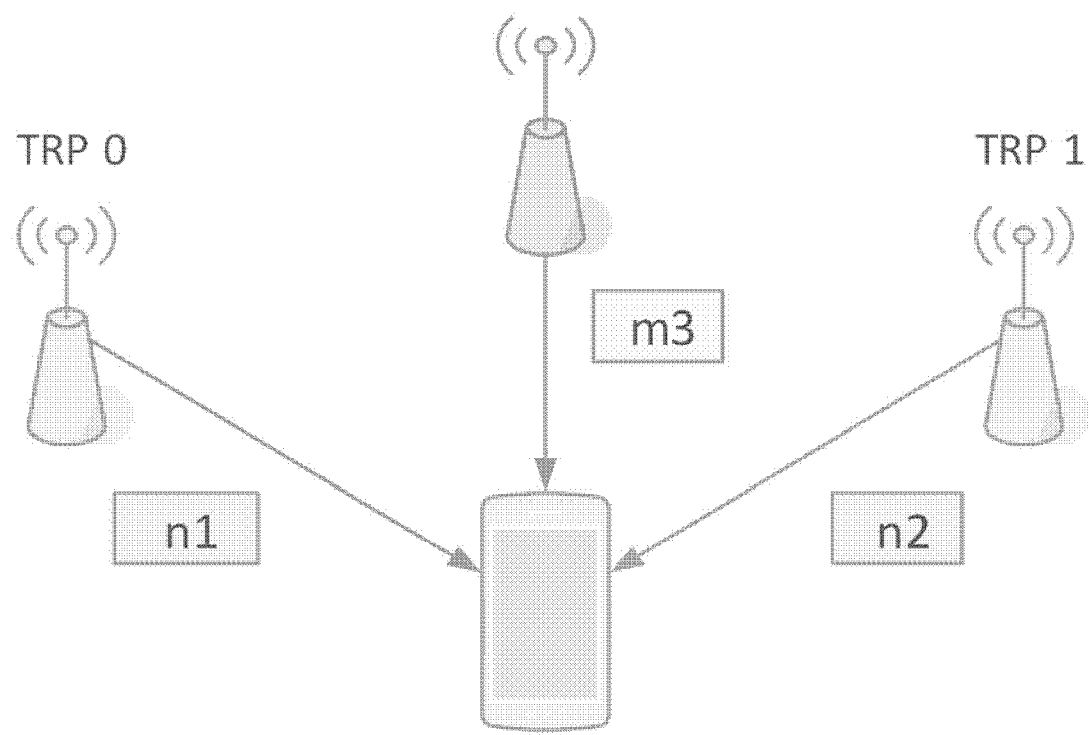
FIG. 10 is an example of a non-coherent joint transmission (NCJT) mTRP scenario with the first and second CMRs and a third CSI-IM, in accordance with certain aspects of the present disclosure.

For NCJT indication, the CRI shown in FIG. 9 further includes a third codepoint (e.g., CRI 2) corresponding to two CMRs (e.g., n1 and n2) and is mapped to a third CSI-IM (e.g., m3) for the mTRP scenario shown in FIG. 10. In this case, the channel/interference hypothesis includes measuring the channel using the CMR n1 corresponding to TRP0 and using the CMR n2 corresponding to TRP1, and measuring interference using the CSI-IM m3 corresponding to interference from the outside measurement set (other than TRP0 and TRP1).

Figure 12A:
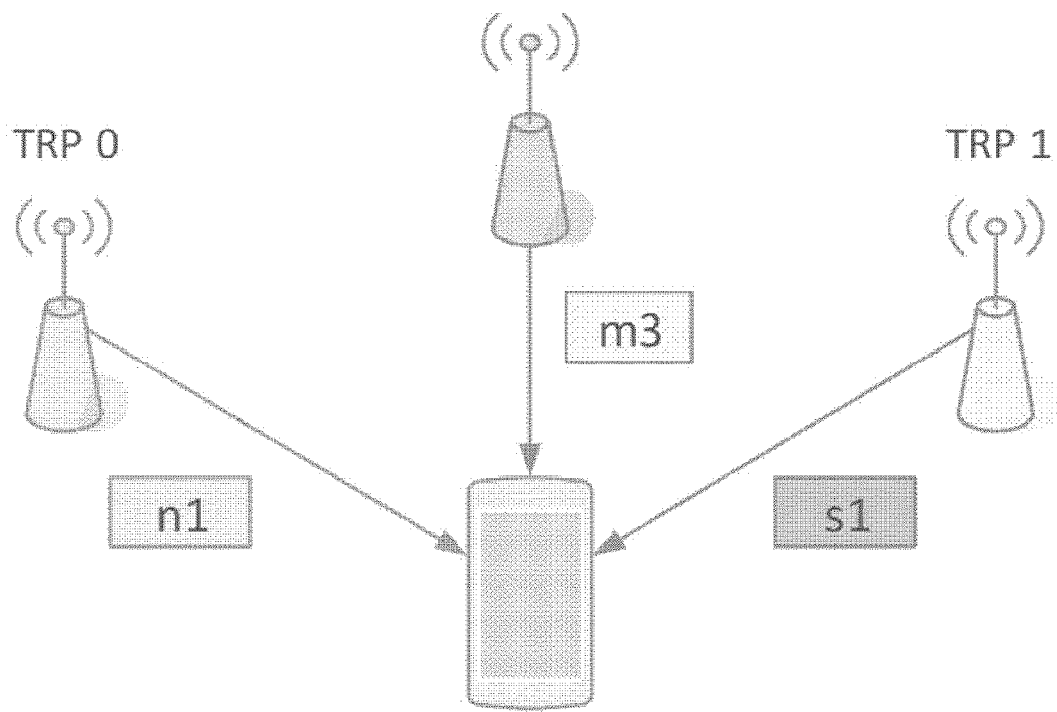
FIG. 12A is an example mTRP scenario with a first CMR and a first NZP-IMR set, in accordance with certain aspects of the present disclosure.

According to certain aspects, there may be a one-to-one mapping between a CRI codepoint (corresponding to a CMR or CMR-pair) and a NZP-IMR set, as shown in FIG. 11. Alternatively, there exists a mapping between one NZP-IMR set to a CMR pair. In mTRP, multiple NZP-IMR sets may be used. As shown in FIG. 11, the NZP-IMR sets may be mapped to the CRI codepoints, corresponding to the CMRs, in addition to the CSI-IMRs. For example, the first CRI codepoint (e.g., CRI 0) further maps to a first NZP-IMR set (e.g., s1) for the mTRP scenario shown in FIG. 12A. In this case, the first channel/interference hypothesis includes measuring the channel using the CMR n1 corresponding to TRP0, measuring interference using the CSI-IM m3 corresponding to interference from other TRPs outside the measurement set, and measuring interference using the NZP-IMR set s1 corresponding to interference from TRP.

Figure 12B:
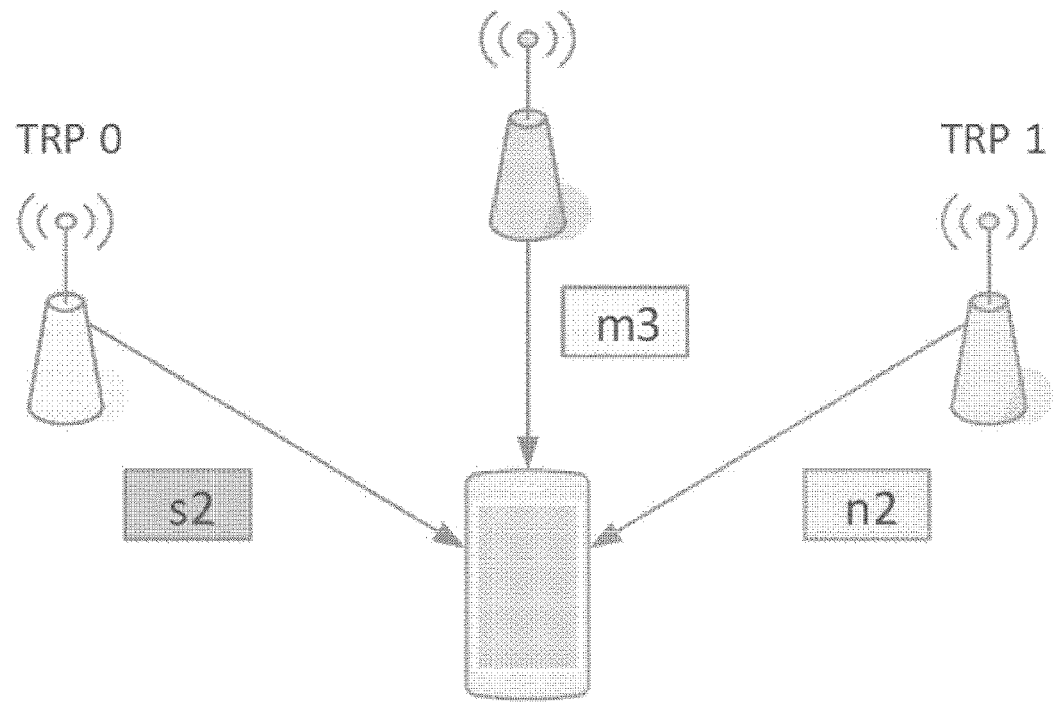
FIG. 12B is an example mTRP scenario with a second CMR and a second NZP-IMR set, in accordance with certain aspects of the present disclosure.

The second CRI codepoint (e.g., CRI 1) maps to a second NZP-IMR set (e.g., s2) for the mTRP scenario shown in FIG. 12B. In this case, the channel/interference hypothesis includes measuring the channel using the CMR n2 corresponding to TRP1, measuring interference using the CSI-IM m3 corresponding to interference from other TRPs outside the measurement set, and measuring interference using the NZP-IMR set s2 corresponding to interference from TRP0.

The third codepoint may be similar to the third CRI codepoint shown in FIG. 9 and does not map to any NZP-IMR (e.g., because both are being measured). In this case, the channel/interference hypothesis includes measuring the channel using the CMR n1 corresponding to TRP0 and using the CMR n2 corresponding to TRP1, measuring interference using the CSI-IM m3 corresponding to interference from the TRPs outside the measurement set (other than TRP0 and TRP1), and not measuring interference using any NZP-IMR set.

According to certain aspects, the UE may apply a quasi-colocation (QCL)-Type D of the CMRs indicated by the CRI to the corresponding CSI-IM(s) and/or NZP-IMR set(s). In some examples, the UE may use a same receive beam for measurements in the CSI-IM(s) and/or NZP-IMR set(s) as a receive beam used for the associated CMR(s).

Example mTRP CSI with TRPs Emulated Using Different CSI Report Configurations

As mentioned above, TRPs may be emulated using different resources and different CSI report configuration. In this case, instead of a third CRI codepoint, separate CSI report configurations may be used.

According to certain aspects, there may be a one-to-one mapping between a CRI codepoint (corresponding to a CMR or CMR-pair) and a CSI-IM resource, as shown in FIG. 13. Alternatively, there exists a mapping between one CSI-IM resource to a CMR pair. For example, the CRI for a first CSI report configuration (CSI report 0) may have a first codepoint (e.g., CRI 0) corresponding to a first CMR (e.g., n1) and mapped to a first CSI-IM (e.g., m1) for the TRP scenario shown in FIG. 8A. The CRI for a second CSI report configuration (CSI report 1) may have a first codepoint (e.g., CRI 0) corresponding to a second CMR (e.g., n2) and mapped to a second CSI-IM (e.g., m2) for the TRP scenario shown in FIG. 8B. For the NCJT indication, the CRI for the first CSI report configuration may have a second codepoint (e.g., CRI 1) corresponding to two CMRs (e.g., n1 and n2) and mapped to a second CSI-IM (e.g., m3) for the mTRP scenario shown in FIG. 10. The CRI for the second CSI report configuration may have a second codepoint (e.g., CRI 1) corresponding to the two CMRs (e.g., n1 and n2) and mapped to the second CSI-IM (e.g., m3) for the mTRP scenario shown in FIG. 10.

According to certain aspects, there may be a one-to-one mapping between a CRI codepoint (corresponding to a CMR or CMR-pair) and a NZP-IMR set, as shown in FIG. 14. Alternatively, there exists a mapping between one NZP-IMR set to a CMR pair. In mTRP, multiple NZP-IMR sets may be used. As shown in FIG. 14, the NZP-IMR sets may be mapped to the CRI codepoints, corresponding to the CMRs, in addition to the CSI-IMRs. For example, the first CSI report may have a first CRI codepoint (e.g., CRI 0) that further maps to a first NZP-IMR set (e.g., s1) for the mTRP scenario shown in FIG. 12A. The second CSI report may have a first CRI codepoint (e.g., CRI 0) that further maps to a second NZP-IMR set (e.g., s2) for the mTRP scenario shown in FIG. 12B. The first CSI report may have a second CRI codepoint (e.g., CRI 1) for NCJT that does not map to any NZP-IMR (e.g., because both are being measured). The second CSI report may also have a second CRI codepoint (e.g., CRI 1) for NCJT that does not map to any NZP-IMR.

According to certain aspects, the UE may apply a QCL-Type D of the CMRs indicated by the CRI to the corresponding CSI-IM(s) and/or NZP-IMR set(s). In some examples, the UE may use a same receive beam for measurements in the CSI-IM(s) and/or NZP-IMR set(s) as a receive beam used for the associated CMR(s).

Example mTRP CSI with TRPs Emulated Using Different CSI Port Groups

As mentioned above, TRPs may be emulated using different CSI port groups.

Figure 16A:
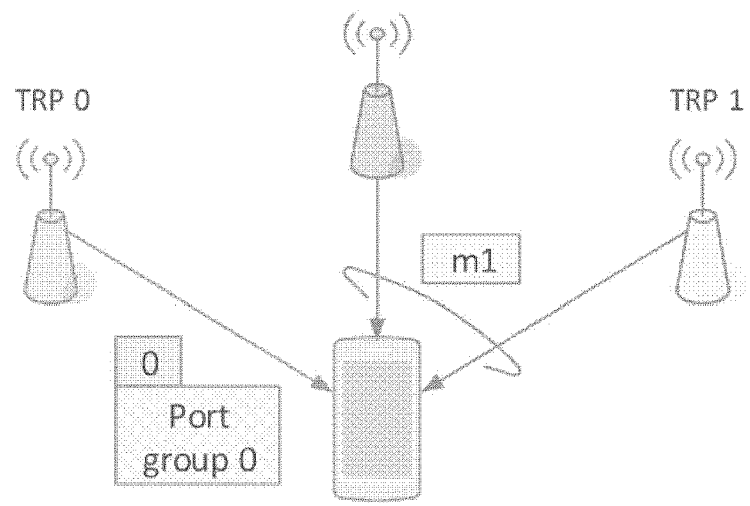
FIG. 16A is an example of an mTRP scenario with a first CMR port group and a first CSI-IM, in accordance with certain aspects of the present disclosure.

According to certain aspects, there may be a one-to-one mapping between a RI-pair (corresponding to a CMR port group or port-group pair) and a CSI-IM resource, as shown in FIG. 15. Alternatively, there exists a mapping between one CSI-IM resource to a port-group or port-group pair. For example, a first RI-pair (e.g., RI0>0, RI1=0) may correspond to a first port group of a CMR (CMR 0, port group 0) associated with a first TCI-state/TRP (e.g., TRP 0) and maps to a first CSI-IM (e.g., m1) as shown in FIG. 16A. In this case, the channel/interference hypothesis includes measuring the channel using the CMR 0 port group 0 corresponding to TRP0, and measuring interference using the CSI-IM m1 corresponding to interference from the TRP1 and other TRPs outside the measurement set.

Figure 16B:
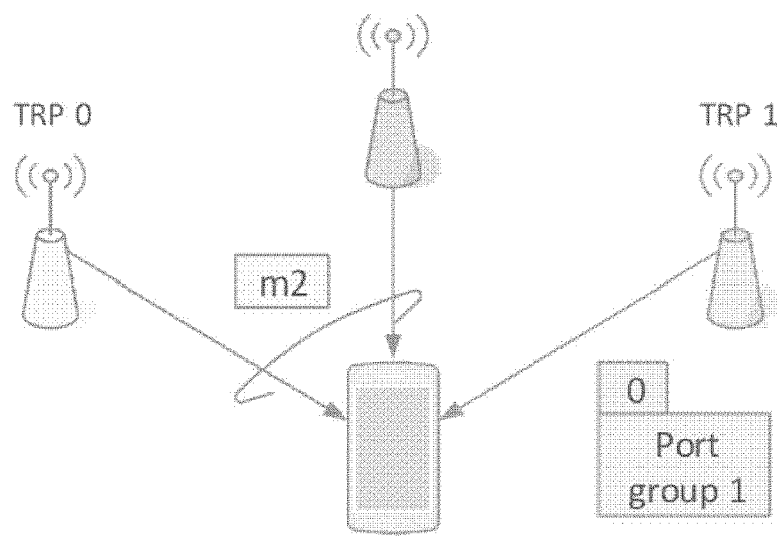
FIG. 16B is an example of an mTRP scenario with a second CMR port group and a second CS-IM, in accordance with certain aspects of the present disclosure.

A second RI-pair (e.g., RI0=0, RI1>0) may correspond to a second port group of the CMR (CMR 0, port group 1) associated with a second TCI-state/TRP (e.g., TRP 1) and maps to a second CSI-IM (e.g., m2) as shown in FIG. 16B. In this case, the channel/interference hypothesis includes measuring the channel using the CMR 0 port group 1 corresponding to TRP1, and measuring interference using the CSI-IM m2 corresponding to interference from the TRP0 and other TRPs outside the measurement set.

Figure 16C:
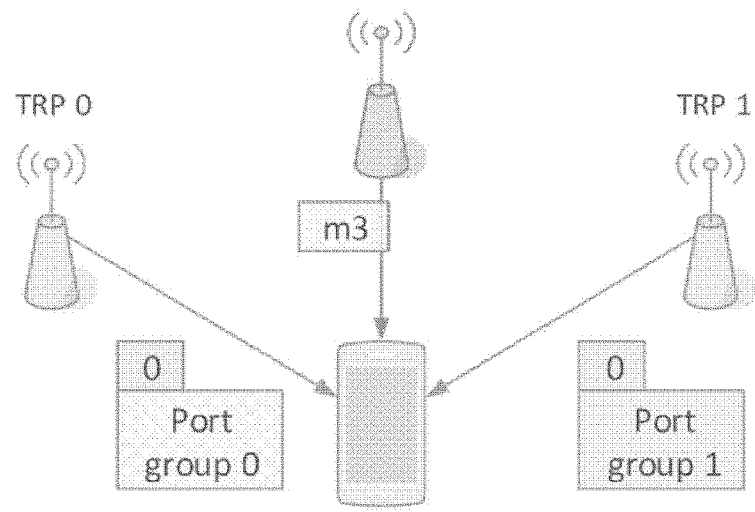
FIG. 16C is an example of a NCJT mTRP scenario with the first CMR port group, the second CMR port group, and a third CS-IM, in accordance with certain aspects of the present disclosure.

For NCJT indication, a third RI-pair (e.g., RI0>0, RI1>0) may correspond to both the first and second port groups of the CMR (e.g., CMR 0, port group 0 and port group 1) and is mapped to a third CSI-IM (e.g., m3) for the mTRP scenario shown in FIG. 16C. In this case, the channel/interference hypothesis includes measuring the channel using the CMR port group 0 corresponding to TRP0 and using the CMR port group 1 corresponding to TRP1, and measuring interference using the CSI-IM m3 corresponding to interference from the TRPs outside the measurement set (other than TRP0 and TRP1).

Figure 18A:
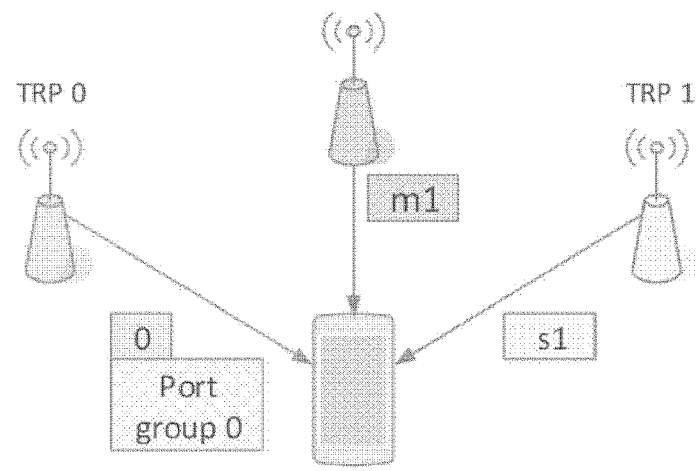
FIG. 18A is an example of an mTRP scenario with a first CMR port group, a first CSI-IM, and first NZP-IMR set, in accordance with certain aspects of the present disclosure.

According to certain aspects, there may be a one-to-one mapping between a RI-pair (corresponding to a CMR port group or port group-pair) and a NZP-IMR set, as shown in FIG. 17. Alternatively, there exists a mapping between one NZP-IMR set to a port-group or port-group pair. In mTRP, multiple NZP-IMR sets may be used. As shown in FIG. 17, the NZP-IMR sets may be mapped to the RI-pairs, corresponding to the CMR port groups, in addition to the CSI-IMRs. For example, the first RI-pair (e.g., RI0>0, RI1=0) further maps to a first NZP-IMR set (e.g., s1) for the TRP scenario shown in FIG. 18A. In this case, the channel/interference hypothesis includes measuring the channel using the CMR 0 port group 0 corresponding to TRP0, measuring interference using the CSI-IM m1 corresponding to interference from the other TRPs outside the measurement set, and measuring interference using the NZP-IMR set s1 corresponding to interference from TRP1.

Figure 18B:
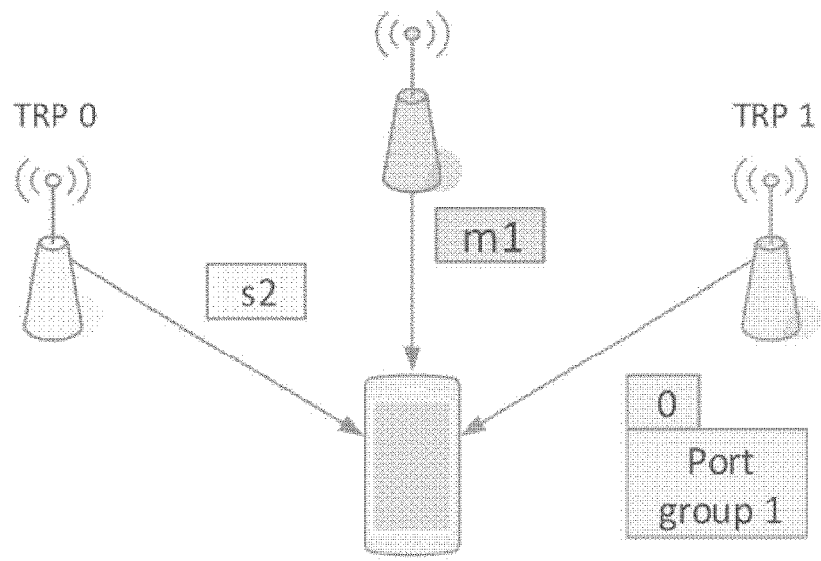
FIG. 18B is an example of an mTRP scenario with a second CMR port group, a second CS-IM, and a second NZP-IMR set, in accordance with certain aspects of the present disclosure.
Figure 18C:
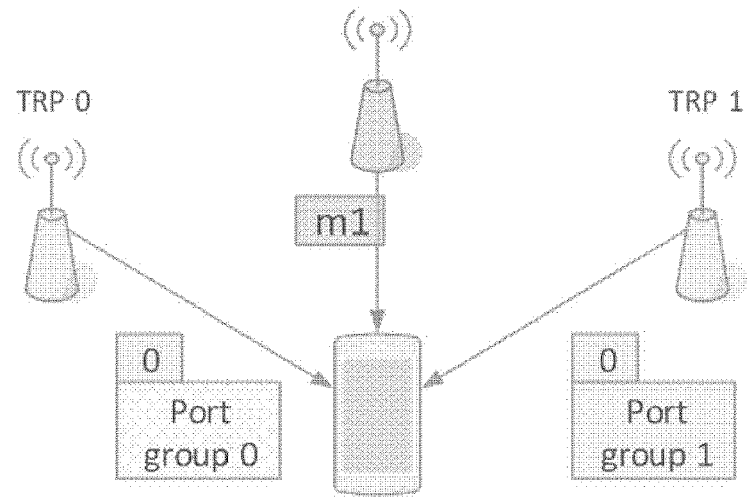
FIG. 18C is an example of a NCJT mTRP scenario with the first CMR port group, the second CMR port group, and a third CS-IM, in accordance with certain aspects of the present disclosure.

The second RI-pair (e.g., RI0=0, RI1>0) maps to a second NZP-IMR set (e.g., s2) for the TRP scenario shown in FIG. 18B. In this case, the channel/interference hypothesis includes measuring the channel using the CMR 0 port group 1 corresponding to TRP1, measuring interference using the CSI-IM m1 corresponding to interference from the other TRPs outside the measurement set, and measuring interference using the NZP-IMR set s2 corresponding to interference from TRP0.

For NCJT, the third RI-pair (e.g., RI0>0, RI1>0) corresponds to both first and second port group of the CMR (e.g., CMR 0, port group 0 and port group 1) and does not map to any NZP-IMR (e.g., because both are being measured). In this case, the channel/interference hypothesis includes measuring the channel using the CMR 0 port group 0 corresponding to TRP0 and using the CMR 0 port group 1 corresponding to TRP1, measuring interference using the CSI-IM m1 corresponding to interference from the TRPs outside the measurement set (other than TRP0 and TRP1), and not measuring interference using any NZP-IMR set.

According to certain aspects, the UE may apply a QCL-Type D of the CMR port groups indicated by the RI-pairs to the corresponding CSI-IM(s) and/or NZP-IMR set(s). In some examples, the UE may use a same receive beam for measurements in the CSI-IM(s) and/or NZP-IMR set(s) as a receive beam used for the associated CMR port group(s).

Figure 20:
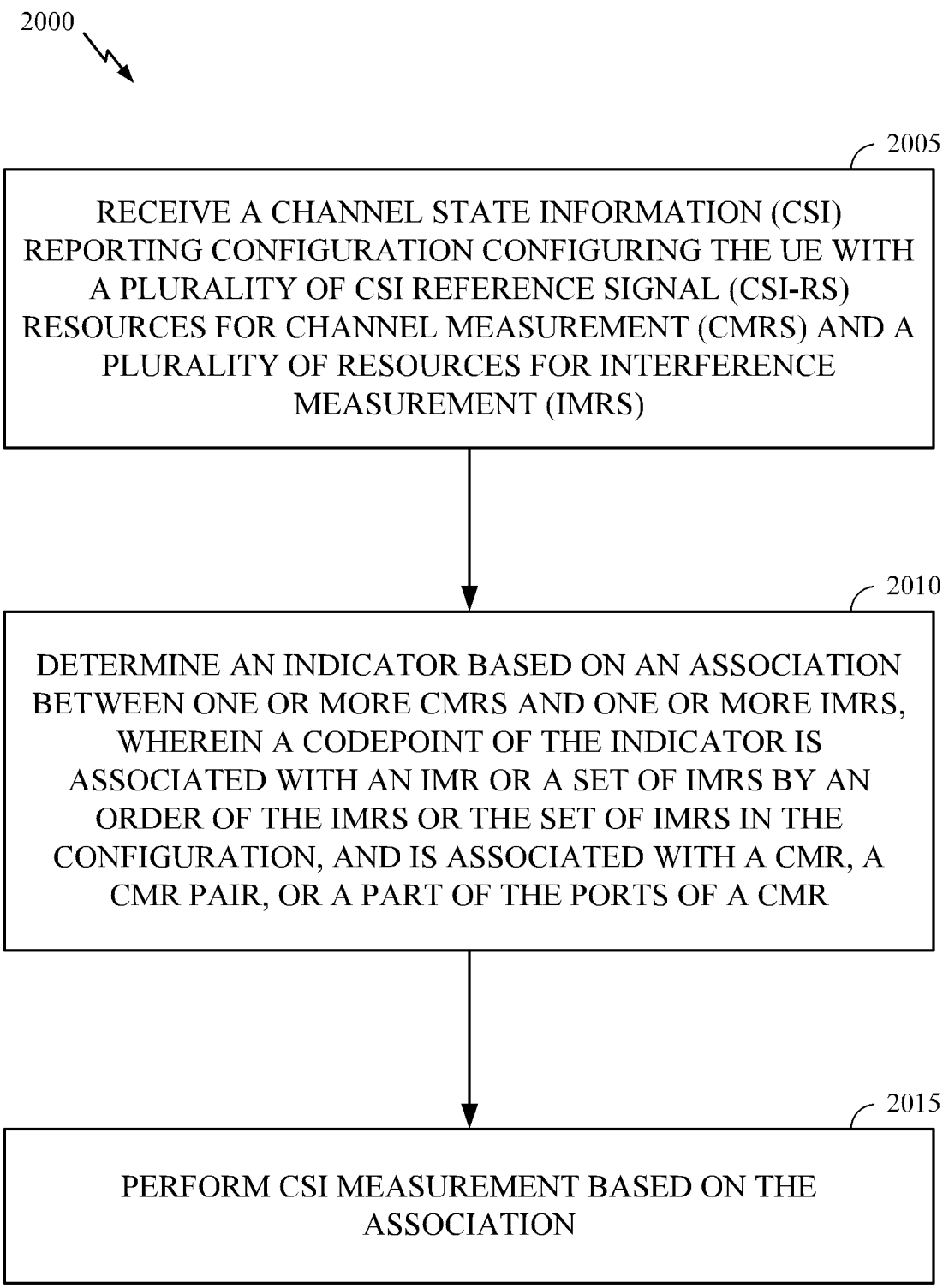
FIG. 20 is a flow diagram illustrating example operations for wireless communication by a UE, in accordance with certain aspects of the present disclosure.

FIG. 20 is a flow diagram illustrating example operations 2000 for wireless communication, in accordance with certain aspects of the present disclosure. The operations 2000 may be performed, for example, by UE (e.g., such as a UE 120a in the wireless communication network 100). Operations 2000 may be implemented as software components that are executed and run on one or more processors (e.g., controller/processor 280 of FIG. 2). Further, the transmission and reception of signals by the UE in operations 2000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 2000 may begin, at 2005, by receiving a CSI reporting configuration configuring the UE with a plurality of CMRs and a plurality of IMRs.

At 2010, the UE determines an indicator based on an association between one or more CMRs and one or more IMRs. A codepoint of the indicator is associated with an IMR or a set of IMRs by an order of the IMRs or the set of IMRs in the configuration, and is associated with a CMR, a CMR pair, or a part of the ports of a CMR.

At 2015, the UE performs CSI measurement based on the association.

In some examples, the UE determines that the IMR is CSI-IM and determines a one-to-one mapping between a codepoint of the indicator and a CSI-IM by an order of the CSI-IM in the configuration. In some examples, the CSI-IM is a zero-power resource for interference measurement.

In some examples, the UE determines that the IMR is NZP-IMR, determines a NZP-IMR resource setting configuring more than one active set of NZP-IMRs, each set including a plurality of NZP-IMRs, and determines a one-to-one mapping between a codepoint of the indicator and an active NZP-IMR set by an order of the NZP-IMR set in the configuration.

In some examples, the indicator is a CRI, the UE determines a first codepoint is associated to a first CMR and to a first CSI-IM resource based on an order of the first CSI-IM resource in the configuration and/or to a first NZP-IMR set based on an order of the first NZP-IMR set in the configuration, and the UE determines a second codepoint is associated to a CMR pair and to a second CSI-IM resource based on an order of the second CSI-IM resource in the configuration and/or to a second NZP-IMR set based on an order of the second NZP-IMR set in the configuration.

In some examples, the indicator is a RI-pair, the UE determines a first RI pair with a zero-rank in the pair is associated to a first port group for a first CMR and to a first CSI-IM resource based on an order of the first CSI-IM resource in the configuration and/or to a first NZP-IMR set based on an order of the first NZP-IMR set in the configuration, and the UE determines a second RI pair with a non-zero-rank in the pair is associated to two port groups of the first CMR and to a second CSI-IM resource based on an order of the second CSI-IM resource in the configuration and/or to a second NZP-IMR set based on an order of the second NZP-IMR set in the configuration.

In some examples, the UE determines a CSI-IM resource or a set of NZP-IMRs is associated with a CMR pair or a CMR with more than one port-groups and the UE determines the QCL of the CSI-IM resource or all the resources within the set of NZP-IMRs based on a QCL of the CMR pair or the QCL of the more than one port-groups within the CMR.

In some examples, the UE determines the association between a codepoint of the indication and a CMR or a CMR-pair based on a configuration transmitted by the network or based on a number of the CMRs following a rule.

Operations corresponding to the operations 2000 may be performed by a BS (e.g., such as the BS 110a).

Example CRI-to-Resource Mapping

According to certain aspects, the UE may be configured with a CRI-to-resource mapping and/or a RI-pair-to-port-grouping mapping. In some examples, the mapping may be configured by the network.

In some examples, the mapping may be configured as a specified rule. For example, the rule may specify that for N resources, the CRI codepoints (e.g., CRI 0 ... N−1) map to resources 0 ... N−1 for single TRP selection and for NCJT the rule may specify CRI $$N \ldots N + \binom{N}{2} - 1$$

(i.e., selecting 2 out of N, corresponding to N*(N−1)/2) maps to a combination of a resource-pair. In another example, the rule may specify for N port-groups, the first $N \cdot RI_{max}$ pairs correspond to single port-group selections and the last $$\binom{N}{2} \times 4$$

pairs correspond to multiple port-group selections. In an illustrative example, for N=2 and $RI_{max}$=4 (e.g., the maximum rank for single-TRP), then the RI-pairs (1,0), (2,0), (3,0) (4,0) are for RI={1, 2, 3, 4} of TRP 0 alone; the RI-pairs (0,1), (0,2), (0,3) (0,4) are for RI={1, 2, 3, 4} of TRP 1 alone; and the RI-pairs (1, 1), (2, 1), (1, 2) (2, 2) are for NCJT with TRP 0 and TRP 1.

In some examples, the network can further configure a CRI-restriction or RI-restriction to allow single TRP CSI only or mTRP CSI only. For example, the CRI-restriction to mTRP CSI may allow the UE only to report the last few CRI codepoints corresponding to mTRP transmission, such that the UE only needs to calculate the CSI for an NJCT. The RI-restriction to mTRP CSI may allow the UE to only report non-zero RI-pairs such that the UE is only allowed to calculate the CSI for NJCT.

Example CRI-to-Codebook Mapping

According to certain aspects, different TRPs may use different codebook configurations. For example, different codebook configurations may use different numbers of CSI ports, different codebook types, different configurations of parameters, and/or different codebook subset restrictions (CBSRs), as shown in FIG. 21. For switching between TRPs and for mTRP, the UE may use multiple codebooks that can handle dynamic configurations of ports, types, parameters, and the like. For example, for the illustrative example described herein where TRP 0 has 4 ports and the TRP 1 has 8 ports, the TRPS may use different codebook configurations. As another example, the TRPs could have different beam restrictions based on levels of interference and for interference muting.

Figure 23C:
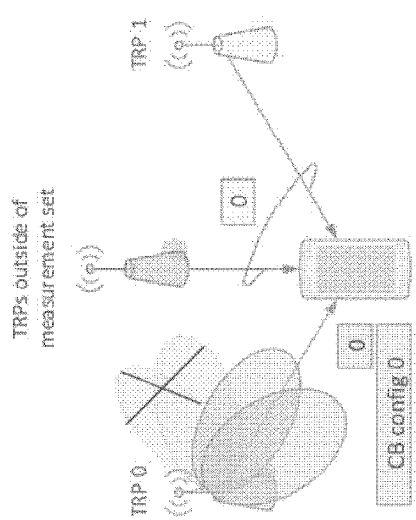
FIG. 23C is example NCJT mTRP scenario with the first and second codebook configurations, in accordance with aspects of the present disclosure.
Figure 23B:
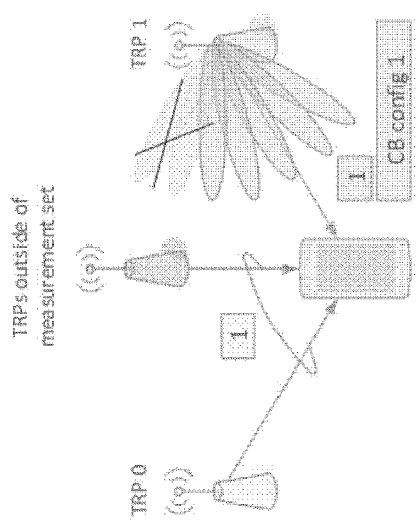
FIG. 23B is example mTRP scenario with a second codebook configuration, in accordance with aspects of the present disclosure.
Figure 23A:
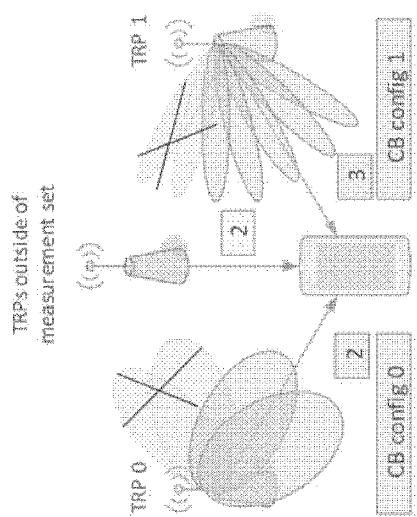
FIG. 23A is example mTRP scenario with a first codebook configuration, in accordance with aspects of the present disclosure.

According to certain aspects, the UE may be configured with a one-to-one mapping of a CRI and/or RI-pair (or port group) codepoint to a codebook as shown in FIG. 22. Alternatively, there exists a one-to-one mapping between a codebook and a resource, or a one-to-one mapping between a codebook and a port-group. The mapping is based on the order of the codebook configuration and the order or the resource configuration or the port-group configuration. The mapping may be configured by the network or fixed (e.g., preconfigured or predefined in a wireless standards). As shown in FIG. 22 is a first codepoint of CRI (or an RI-pair) further maps to a first codebook configuration (e.g., CB configuration 0) for the mTRP scenario shown in FIG. 23A. A second codepoint of the CRI (or an RI-pair) further maps a second codebook configuration (e.g., CB configuration 1) for the mTRP scenario shown in FIG. 23B. A third codepoint of CRI further maps to the first and second codebook configurations (e.g., CB configuration 0 and CB configuration 1) for the mTRP scenario shown in FIG. 23C.

Figure 24:
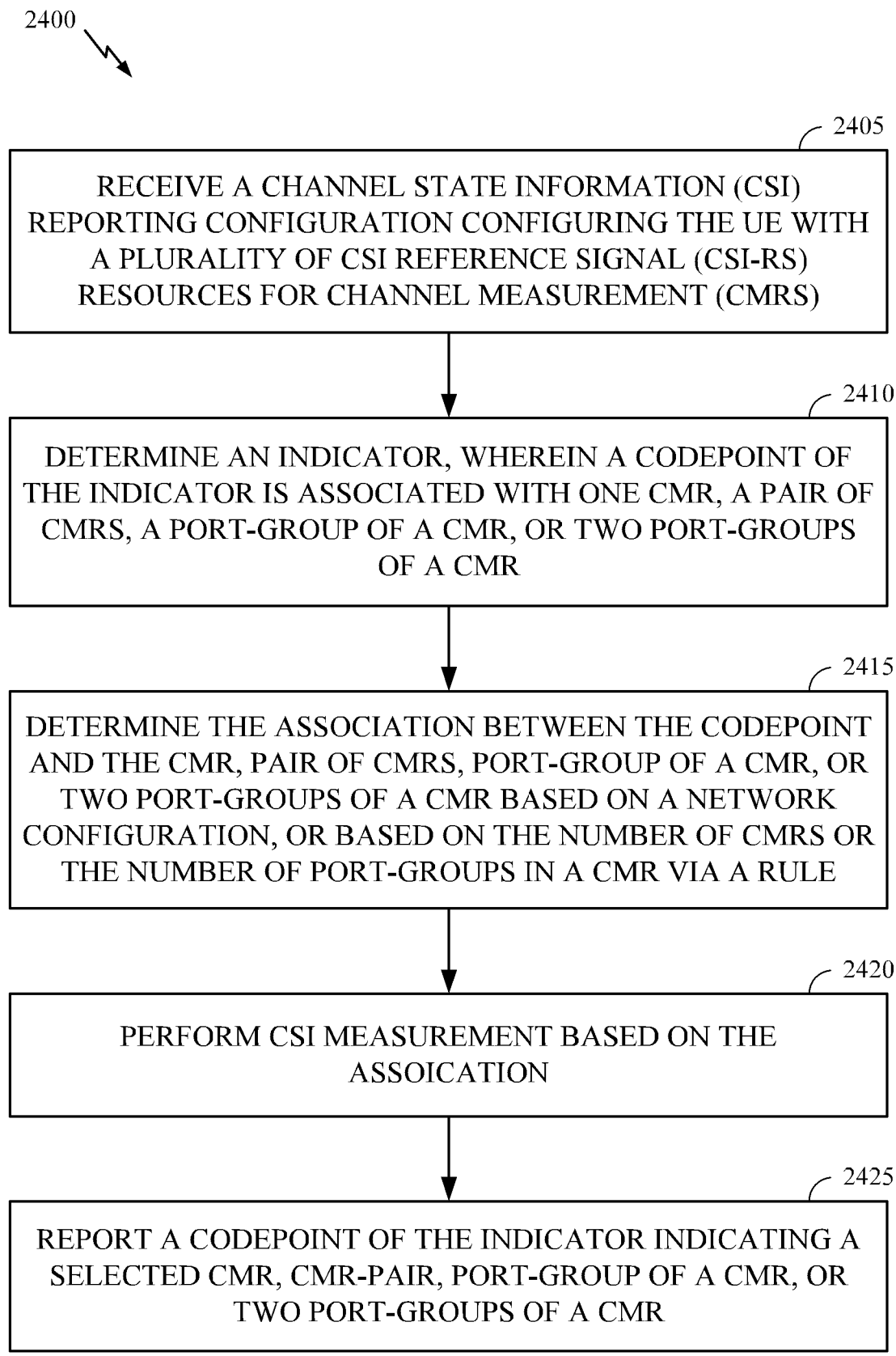
FIG. 24 is a flow diagram illustrating example operations for wireless communication by a UE, in accordance with certain aspects of the present disclosure.

FIG. 24 is a flow diagram illustrating example operations 2400 for wireless communication, in accordance with certain aspects of the present disclosure. The operations 2400 may be performed, for example, by UE (e.g., such as a UE 120a in the wireless communication network 100). Operations 2400 may be implemented as software components that are executed and run on one or more processors (e.g., controller/processor 280 of FIG. 2). Further, the transmission and reception of signals by the UE in operations 2400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 2400 may begin, at 2405, by receiving a CSI reporting configuration configuring the UE with a plurality of CMRs.

At 2410, the UE determines an indicator. A codepoint of the indicator is associated with one CMR, a pair of CMRs, a port-group of a CMR, or two port-groups of a CMR. The indicator may be a CRI or RI-pair.

At 2415, the UE determines the association between the codepoint and the CMR, pair of CMRs, port-group of a CMR, or two port-groups of a CMR based on a network configuration, or based on the number of CMRs or the number of port-groups in a CMR via a rule.

In some examples, the UE determines a first set of codepoints is associated with a single CMR or a single port-group of a CMR. The number of codepoints in the first set may be equal to the number of CMRs or the number of port-groups in a CMR. The UE determines a second set of codepoints is associated with a CMR-pair or two port-groups of a CMR. The number of codepoints in the second set may be equal to the total number of CMR pairs among all CMRs or is equal to the total number of port-group pairs among all port-groups in a CMR.

At 2420, the UE performs CSI measurement based on the association.

At 2425, the UE reports a codepoint of the indicator indicating a selected CMR, CMR-pair, port-group of a CMR, or two port-groups of a CMR.

In some examples, the UE receives, from the network, a CRI-restriction or a RI-pair restriction restricting a subset of the codepoint. The UE performs the CSI measurement for the CMR, CMR pair, port-groups, or port-group-pairs associated with non-restricted codepoints and reports a codepoint of the indicator from the subset of non-restricted codepoints.

In some examples, the UE receives more than one codebook configuration from the network. The UE determines the association between codebook configurations and CMRs or port-groups in a CMR based on a network configuration, or determines the association between codebook configurations and the codepoints of the indication based on a network configuration.

In some examples, each indicated codebook comprises a number of ports, a type of CSI feedback, and/or a codebook subset restriction.

Operations corresponding to the operations 2400 may be performed by a BS (e.g., such as the BS 110a).

Figure 25:
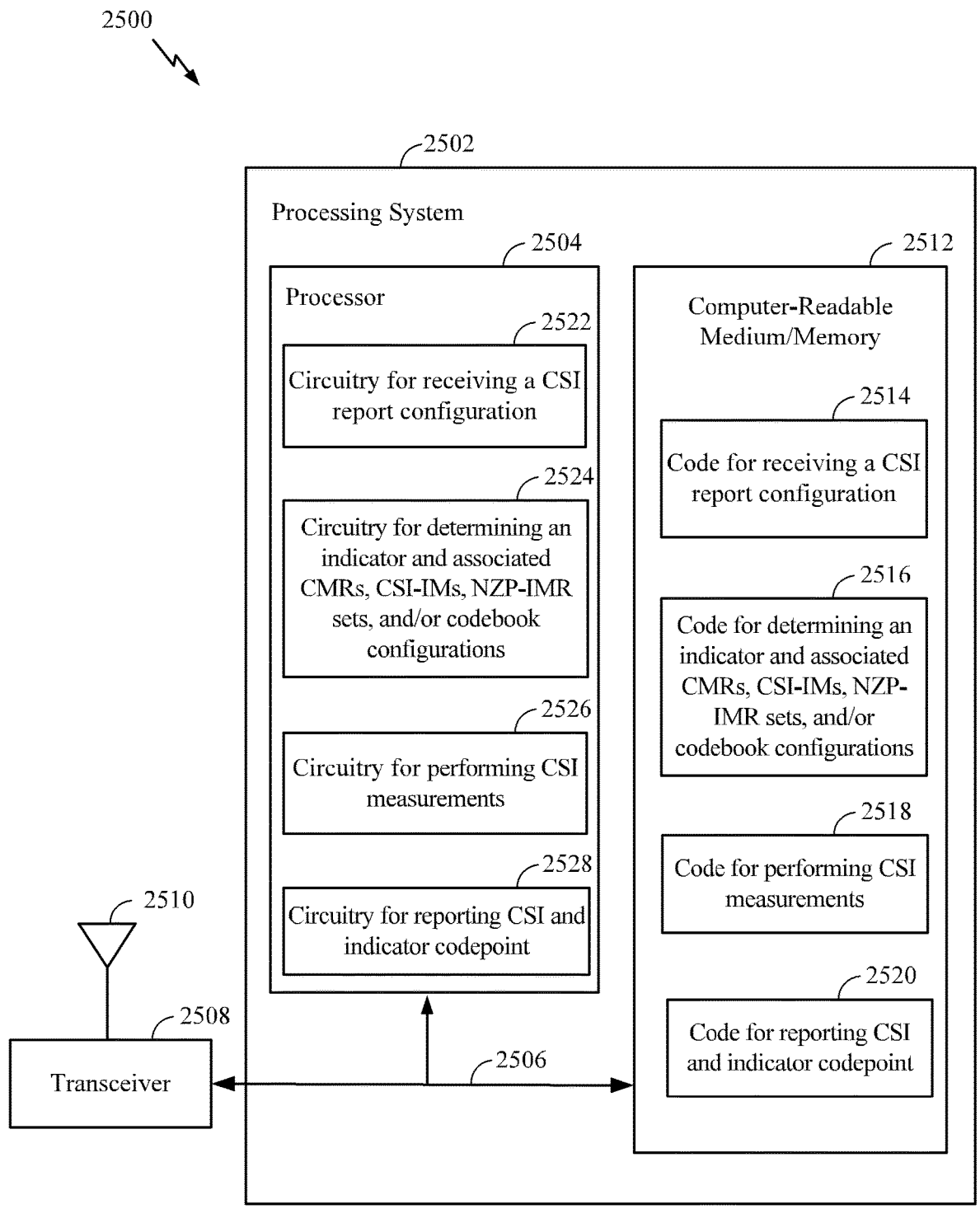
FIG. 25 illustrates a communications device that may include various components configured to perform operations for the techniques disclosed herein in accordance with aspects of the present disclosure.

FIG. 25 illustrates a communications device 2500 that may include various components (e.g., corresponding to means-plus-function components) configured to perform operations for the techniques disclosed herein, such as the operations illustrated in FIG. 20 and/or FIG. 24. The communications device 2500 includes a processing system 2502 coupled to a transceiver 2508 (e.g., a transmitter and/or a receiver). The transceiver 2508 is configured to transmit and receive signals for the communications device 2500 via an antenna 2510, such as the various signals as described herein. The processing system 2502 may be configured to perform processing functions for the communications device 2500, including processing signals received and/or to be transmitted by the communications device 2500.

The processing system 2502 includes a processor 2504 coupled to a computer-readable medium/memory 2512 via a bus 2506. In certain aspects, the computer-readable medium/memory 2512 is configured to store instructions (e.g., computer-executable code) that when executed by the processor 2504, cause the processor 2504 to perform the operations illustrated in FIG. 20 and/or FIG. 24, or other operations for performing the various techniques discussed herein for mTRP CSI. In certain aspects, computer-readable medium/memory 2512 stores code 2514 for receiving a CSI report configuration; code 2516 for determining an indicator and associated CMRs, CSI-IMs, NZP-IMR sets, and/or codebook configurations, code 2518 for performing CSI measurements, and/or code 2520 for reporting CSI and indicator codepoint, in accordance with aspects of the disclosure. In certain aspects, the processor 2504 has circuitry configured to implement the code stored in the computer-readable medium/memory 2512. The processor 2504 includes circuitry 2522 for receiving a CSI report configuration; circuitry 2524 for determining an indicator and associated CMRs, CSI-IMs, NZP-IMR sets, and/or codebook configurations, circuitry 2526 for performing CSI measurements, and/or circuitry 2528 for reporting CSI and indicator codepoint, in accordance with aspects of the disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 20 and/or FIG. 24.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), the method comprising:
receiving a channel state information (CSI) reporting configuration configuring the UE with one or more CSI reference signal (CSI-RS) resources for channel measurement (CMRs) and one or more resources for interference measurement (IMRs);
determining a rank indicator (RI) pair, wherein determining the RI pair comprises: determining a first RI pair, with a zero-rank in the first RI pair, is associated to a first port group for a first CMR and at least one of: a first CSI-IM resource based on an order of the first CSI-IM resource in the CSI-RS reporting configuration, or a first NZP-IMR set based on an order of the first NZP-IMR set in the CSI-RS reporting configuration;
determining a second RI pair, with a non-zero-rank in the second RI pair, is associated to two port groups of the first CMR, and at least one of: a second CSI-IM resource based on an order of the second CSI-IM resource in the CSI-RS reporting configuration, or a second NZP-IMR set based on an order of the second NZP-IMR set in the CSI-RS reporting configuration;
determining a one-to-one mapping between each IMR of the one or more IMRs and a CMR or a CMR pair of the one or more CMRs; and
performing CSI measurement based on the determining the one-to-one mapping.

2. The method of claim 1, wherein the one or more IMRs comprise one or more CSI-RS resources for interference measurement (CSI-IMs).

3. The method of claim 2, further comprising:
determining the one or more CSI-IM resources are quasi-colocated (QCLed) with the associated CMR or CMR pair.

4. The method of claim 2, wherein the one or more CSI-IMs comprise zero-power resources for interference measurement.

5. The method of claim 1, wherein:
the one or more IMRs comprise one or more non-zero power (NZP) CSI-RS resources for interference measurement (NZP-IMRs);
the method further comprises determining a NZP-IMR resource setting configuring more than one active set of NZP-IMRs;
each set of ZNP-IMR includes a plurality of NZP-IMRs; and
the method further comprises determining a one-to-one mapping between a codepoint of an indicator and an active NZP-IMR set by an order of the NZP-IMR set in the CSI-RS reporting configuration.

6. The method of claim 1, wherein:

determining the one-to-one mapping comprises:
  determining a first one-to-one mapping between a CMR and a first IMR; and
  determining a second one-to-one mapping between a CMR pair and a second IMR.

7. The method of claim 1, further comprising:
receiving signaling from a network entity configuring an association between a codepoint of an indicator and a CMR or a CMR-pair or a rule.

8. The method of claim 1, wherein each CMR or CMR pair is associated with a CSI resource indicator (CRI).

9. The method of claim 1, wherein the determining the one-to-one mapping between each IMR of the one or more IMRs and a CMR or CMR pair is based on an order of the IMR in the CSI reporting configuration.

10. A method for wireless communication by a network entity, the network entity comprising:
  configuring a user equipment (UE) with a channel state information (CSI) reporting configuration configuring the UE with a one or more CSI reference signal (CSI-RS) resources for channel measurement (CMRs) and one or more resources for interference measurement (IMRs);
  determining a rank indicator (RI) pair, wherein determining the RI pair comprises:
    determining a first RI pair, with a zero-rank in the first RI pair, is associated to a first port group for a first CMR and at least one of: a first CSI-IM resource based on an order of the first CSI-IM resource in the CSI-RS reporting configuration, or a first NZP-IMR set based on an order of the first NZP-IMR set in the CSI-RS reporting configuration; and
    determining a second RI pair, with a non-zero-rank in the second RI pair, is associated to two port groups of the first CMR, and at least one of: a second CSI-IM resource based on an order of the second CSI-IM resource in the CSI-RS reporting configuration, or a second NZP-IMR set based on an order of the second NZP-IMR set in the CSI-RS reporting configuration
  determining a one-to-one mapping between each IMR of the one or more IMRs and a CMR or a CMR pair of the one or more CMRs; and
  receiving a CSI report based on an association between a codepoint of an indicator and a CMR or a CMR-pair or a rule.

11. The method of claim 10, wherein the one or more IMRs comprise one or more CSI-RS resources for interference measurement (CSI-IMs).

12. The method of claim 11, further comprising determining the one or more CSI-IM resources are quasi-colocated (QCLed) with the associated CMR or CMR pair.

13. The method of claim 11, wherein the one or more CSI-IMs comprise zero-power resources for interference measurement.

14. The method of claim 10, wherein:
  the one or more IMRs comprise one or more non-zero power (NZP) CSI-RS resources for interference measurement (NZP-IMRs);
  the method further comprises determining a NZP-IMR resource setting configuring more than one active set of NZP-IMRs;
  each set of ZNP-IMR includes a plurality of NZP-IMRs; and
  the method further comprises determining a one-to-one mapping between the codepoint of the indicator and an active NZP-IMR set by an order of the NZP-IMR set in the CSI-RS reporting configuration.

15. The method of claim 10, wherein:
determining the one-to-one mapping comprises:
  determining a first one-to-one mapping between a CMR and a first IMR; and
  determining a second one-to-one mapping between a CMR pair and a second IMR.

16. The method of claim 10, further comprising:
configuring the UE with the association.

* * * * *